US009371669B2

(12) United States Patent
Berg et al.

(10) Patent No.: US 9,371,669 B2
(45) Date of Patent: Jun. 21, 2016

(54) REMOTE-ACTIVATION LOCK SYSTEM AND METHOD

(76) Inventors: John S. Berg, Franklin, MA (US); Christopher H. Reynolds, Wayland, MA (US); Jibing Lin, Pleasanton, CA (US); David A. Vogel, Westwood, MA (US); Paul A. Keenan, Harrisville, RI (US); John R. Howard, Ashland, MA (US)

( * ) Notice: Subject to any disclaimer, the term of this patent is extended or adjusted under 35 U.S.C. 154(b) by 975 days.

(21) Appl. No.: 12/785,422

(22) Filed: May 21, 2010

(65) Prior Publication Data

US 2010/0300159 A1 Dec. 2, 2010

Related U.S. Application Data

(60) Provisional application No. 61/180,714, filed on May 22, 2009, provisional application No. 61/180,719, filed on May 22, 2009, provisional application No. 61/231,952, filed on Aug. 6, 2009, provisional application No. 61/242,351, filed on Sep. 14, 2009, provisional application No. 61/247,483, filed on Sep. 30, 2009, provisional application No. 61/248,791, filed on Oct. 5, 2009, provisional application No. 61/261,619, filed on Nov. 16, 2009, provisional application No. 61/285,285, filed on Dec. 10, 2009, provisional application No. 61/292,606, filed on Jan. 6, 2010, provisional application No. 61/300,257, filed on Feb. 1, 2010, provisional application No. 61/311,471, filed on Mar. 8, 2010, provisional application No. 61/312,758, filed on Mar. 11, 2010.

(51) Int. Cl.

| B32B 7/12 | (2006.01) |
|---|---|
| E05B 47/02 | (2006.01) |
| C09J 9/02 | (2006.01) |
| C09J 163/00 | (2006.01) |
| C09J 175/04 | (2006.01) |
| E05B 73/00 | (2006.01) |
| E05B 65/00 | (2006.01) |
| E05B 47/00 | (2006.01) |
| E05C 19/16 | (2006.01) |

(52) U.S. Cl.
CPC . *E05B 47/02* (2013.01); *C09J 9/02* (2013.01); *C09J 163/00* (2013.01); *C09J 175/04* (2013.01); *E05B 73/0017* (2013.01); *E05B 65/006* (2013.01); *E05B 2047/0094* (2013.01); *E05C 19/16* (2013.01); *Y10T 70/5009* (2015.04); *Y10T 428/2848* (2015.01)

(58) Field of Classification Search
None
See application file for complete search history.

(56) References Cited

U.S. PATENT DOCUMENTS

| 3,892,567 | A | * | 7/1975 | Ciccarelli et al. | 430/50 |
|---|---|---|---|---|---|
| 3,947,403 | A | * | 3/1976 | McCready | 524/507 |
| 4,641,291 | A | * | 2/1987 | Simmons et al. | 367/157 |
| 4,749,833 | A | | 6/1988 | Novorsky et al. | |
| 4,894,615 | A | * | 1/1990 | Mermelstein | 324/244 |
| 5,100,494 | A | * | 3/1992 | Schmidt | 156/712 |
| 5,609,954 | A | | 3/1997 | Aizawa et al. | |
| 5,889,118 | A | * | 3/1999 | Delgado et al. | 525/228 |
| 6,387,449 | B1 | * | 5/2002 | Reid et al. | 427/385.5 |
| 6,620,308 | B2 | | 9/2003 | Gilbert | |
| 6,639,197 | B2 | | 10/2003 | Riess et al. | |
| 6,780,940 | B2 | | 8/2004 | Yoshihara et al. | |
| 6,849,837 | B2 | | 2/2005 | Riess et al. | |
| 6,855,760 | B1 | * | 2/2005 | Kirsten et al. | 524/394 |
| 7,023,206 | B2 | * | 4/2006 | Viehland et al. | 324/249 |
| 7,140,489 | B2 | | 11/2006 | Lax et al. | |
| 7,332,218 | B1 | | 2/2008 | Gilbert | |
| 7,371,300 | B2 | | 5/2008 | Bain et al. | |
| 7,465,492 | B2 | | 12/2008 | Gilbert | |
| 7,568,742 | B2 | | 8/2009 | Kim | |
| 7,569,624 | B2 | * | 8/2009 | Kolbe et al. | 523/200 |
| 8,377,245 | B2 | * | 2/2013 | Bauer et al. | 156/247 |
| 8,464,956 | B2 | * | 6/2013 | Ho et al. | 235/492 |
| 2004/0050839 | A1 | | 3/2004 | Riess et al. | |
| 2004/0129587 | A1 | | 7/2004 | Lax et al. | |
| 2004/0171753 | A1 | * | 9/2004 | Agrawal et al. | 525/123 |
| 2005/0274454 | A1 | * | 12/2005 | Extrand | 156/272.4 |
| 2005/0274455 | A1 | * | 12/2005 | Extrand | 156/272.4 |
| 2006/0101919 | A1 | * | 5/2006 | Gunnerman et al. | 73/643 |
| 2006/0108252 | A1 | | 5/2006 | Lax | |
| 2006/0116899 | A1 | | 6/2006 | Lax et al. | |
| 2006/0162855 | A1 | | 7/2006 | Dabelstein et al. | |
| 2007/0269659 | A1 | * | 11/2007 | Gilbert | 428/414 |
| 2008/0075930 | A1 | * | 3/2008 | Kornbluh et al. | 428/189 |
| 2008/0196828 | A1 | * | 8/2008 | Gilbert | 156/274.8 |
| 2008/0204850 | A1 | | 8/2008 | Agrawal et al. | |
| 2009/0035580 | A1 | * | 2/2009 | Chino et al. | 428/411.1 |
| 2012/0040177 | A1 | * | 2/2012 | Nakashima et al. | 428/323 |
| 2012/0098530 | A1 | * | 4/2012 | Saito et al. | 324/209 |
| 2013/0252030 | A1 | * | 9/2013 | Ryu et al. | 428/800 |

FOREIGN PATENT DOCUMENTS

| JP | 07-145357 | 6/1995 | |
|---|---|---|---|
| WO | WO0073398 A1 * | 12/2000 | C01J 11/04 |

OTHER PUBLICATIONS

"ElectRelease Electrically-Debonding Adhesive", EIC Laboratories, Inc., 2004.*
Steven M. Kaplan (Lexicographer), "Wiley Electrical and Electronics Engineering Dictionary", definition of terms "electrostrictive" and magnetostrictive, ,2004, John Wiley & Sons Inc., p. 252 and p. 450.*
N. Yoshizawa et al., "Magnetic Field Sensing by an Electrostrictive/Magnetostrictive Composite Resonator", IEEE Transactions on Magnetics, vol. 41, Issue No. 11, Nov. 2005. pp. 4359-4361.*
"Refusing Reason Notice", Japanese Patent Office, Jan. 9, 2014 {Note: Japanese Patent Application related to U.S. Appl. 12/785,422}.
"Office Action", Chinese Patent Office, Sep. 13, 2013 {Note: Japanese Patent Application related to U.S. Appl. No. 12/785,422}.

* cited by examiner

Primary Examiner — Alicia Chevalier
Assistant Examiner — Anish Desai
(74) *Attorney, Agent, or Firm* — Withers Bergman LLP

(57) ABSTRACT

Remote-activation locks designed to permit unlocking and/or locking of the lock without physical manipulation of the lock are articulated to a product/good in a manner so as to deny one or more benefits associated with the product/good.

10 Claims, 22 Drawing Sheets

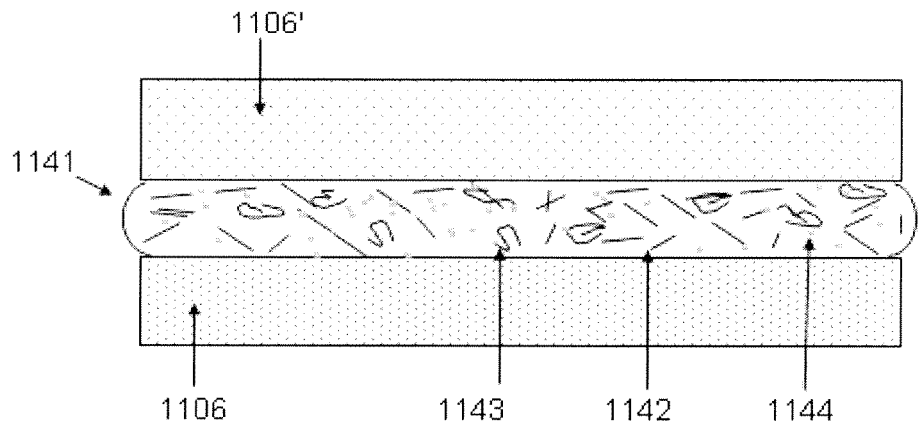
Figure 22A: A cross-sectional schematic view of an embodiment of an electrically releasable adhesive system with no applied voltage across the two substrates
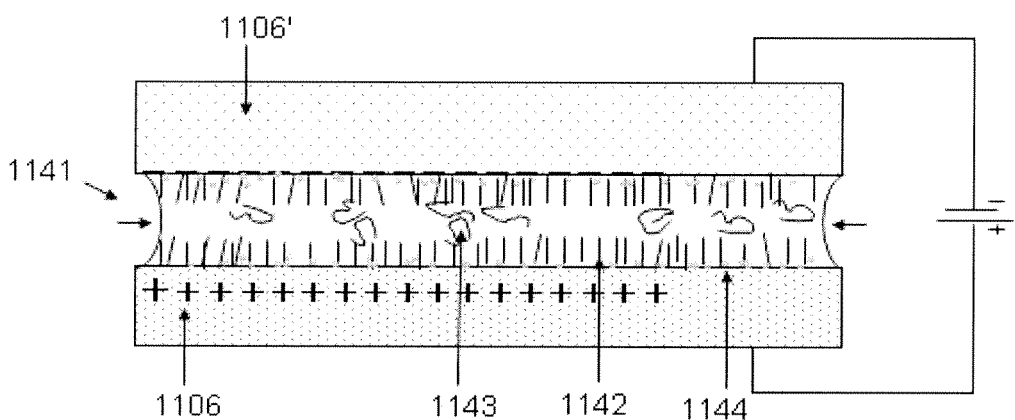
Figure 22B: A cross-sectional schematic view of an embodiment of an electrically releasable adhesive system with an applied voltage across the two substrates

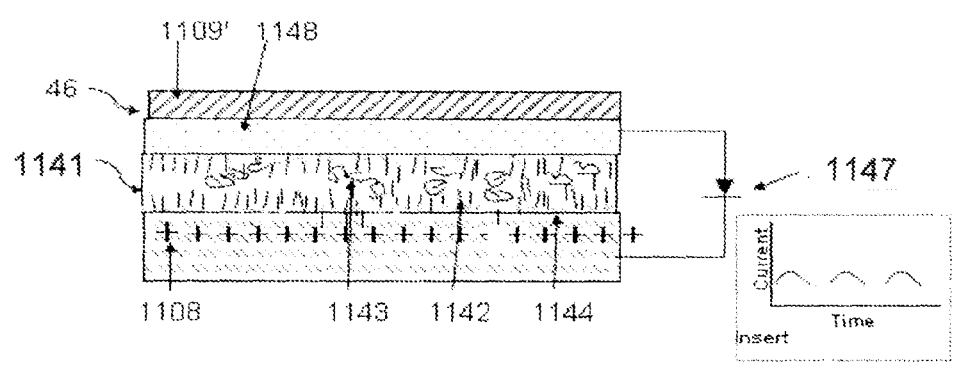
Fig. 23: A cross-sectional schematic representation of the remotely controllable adhesive system and the applied current (insert)

REMOTE-ACTIVATION LOCK SYSTEM AND METHOD

RELATED APPLICATIONS

This application claims the benefit of priority under 35 U.S.C. §119(e) to U.S. provisional application Ser. Nos. 61/180,714, filed May 22, 2009, 61/180,719, filed May 22, 2009, 61/231,952, filed Aug. 6, 2009, 61/242,351, filed Sep. 14, 2009, 61/247,483, filed Sep. 30, 2009, 61/248,791, filed Oct. 5, 2009, 61/261,619, filed Nov. 16, 2009, 61/285,285, filed Dec. 10, 2009, 61/292,606, filed Jan. 6, 2010, 61/300,257, filed Feb. 1, 2010, 61/311,471, filed Mar. 8, 2010, and 61/312,758, filed Apr. 2, 2010, all of which are incorporated herein by reference in their entirety.

FIELD OF THE INVENTION

The present invention generally relates to remote-activation locks designed to permit unlocking and/or locking of the lock without physical manipulation of the lock. More specifically, remote-activation lock embodiments described herein may be used to deny one or more benefits associated with a product, by causing such benefits not to be accessible when the lock is in an activated (or locked) configuration. Such locks may be applied to render a product unfit for sale, or less than desirable for sale, unless the locking mechanism is deactivated (or unlocked). Remote-activation lock embodiments may be deactivated or activated by application of select electromagnetic emissions or profiles. Remote-activation locks described may include both activation and deactivation components which will counteract one another in action if other than the correct transmission is used to effectuate a change in the state of the lock, for example, when one attempts to subvert the locking system by using a broad spectrum emission.

DESCRIPTION OF THE RELATED ART

A significant challenge facing many businesses which produce and market products is the theft, unauthorized use or piracy of those products. According to the Hayes International Research Retail Theft Survey, in 2008 retailers worldwide lost over $87 Billion as a direct result of theft and subsequently spent over $25 Billion on loss prevention methods. Losses are also incurred by theft from the manufacturer's site, cargo theft, and distribution chain diversion. Such losses may rival retail losses due to theft.

Due to the losses incurred by manufacturers, distributors, shippers and retailers due to theft, each has undertaken numerous techniques to reduce pilfering. Many of these techniques entail the sequestering of product in highly secure containers, that is keeping the products out of the direct reach of employees, shippers and customers. The problem with such technique is that it is often advantageous to be able to gain access to the actual product for testing purposes, inventory purposes, and sales purposes. For example, professional merchandisers widely believe that sales of products currently harbored within or behind a display counter could be greatly improved if direct access were provided to the customer. Such "open merchandising" is especially apt for "high-touch" marketing of personal, customizable, or immersive products such as music players, image stabilizing and multi-focus cameras, games, and movie discs. It is one of the aims of the present invention to empower retailers to practice open merchandising while protecting them from shoplifting.

SUMMARY OF THE INVENTION

As more and more electronic devices and electronic device accessories are miniaturized and it has become easier to surreptitiously pocket highly valuable products. Thus theft loses are only expected to grow.

Disclosed herein, in embodiments, are remote-activation locks configured to prevent the unauthorized access to, and/or use (and/or full beneficial use), of products comprising, but not limited to, electronic devices, electronic device accessories (such as electronically readable media), and consumables (collectively, "products"). In one embodiment, such locks employ a transmission-sensitive adhesive system which changes in physical characteristic upon receipt of a defined transmission range. Such changes in some embodiments entail a change in volume which is used to lock or unlock the lock, or portion of the lock, or a change in adhesiveness.

Remote-activation locks of this disclosure may in their locked-state be physically bonded to the product, or to a enclosure case covering the product. Such locks may be positioned to prevent the product from being used, or fully used, as intended. Release of the lock may be by means of an externally applied stimulus, and in an advantageous embodiment by way of an electromagnetic transmission to the lock of a defined wavelength, strength, and/or pulse spectrum. Suitable stimuli may also comprise a magnetic or electrical stimulus. Remote-activation locks of the present disclosure include assemblies having more than one lock component.

When adhesive systems are used by the locking system, such systems may comprise one or more adhesive materials. To effectuate distribution of the energy of the transmission throughout the adhesive, the adhesive may further comprise one or more energy distribution components, which may be associated with one or more surfaces of any adhesive layer, and/or distributed uniformly or non-uniformly in the adhesive itself. Such energy distribution component may comprise, for example, a metal layer or metal quantum dots which is receptive to the transmission. The energy distribution components may in function convert the intercepted transmission energy into a second form of energy, such as converting a radio wave transmission into heat, thus acting as an energy converter. The second form of energy may cause a change in a physical property of the adhesive material composition that permits the locking or unlocking. Thus, the resulting change in one or more physical properties of the adhesive (such as tackiness, bonding strength, density, etc.) may be used to unlock the lock assembly.

In some embodiments, the remote-activation locks may comprise additional lock components which may, for a non-limiting example, provide relocking and anti-spoofing (i.e., prevention of unauthorized attempts to unlock the lock) capabilities. For example, first lock component may comprise an adhesive system that changes in density when exposed to a particular energy transmission (for example, increasing in volume for the same mass of adhesive material when exposed to a wavelength of x) wherein the density change induces an unlocking. Second lock component may comprise an adhesive system that is activated to an adhesive state, or wherein a density change occurs when exposed to a particular energy transmission, such as exposure to a wavelength of y, wherein such lock component locks when exposed to the wavelength of y. Therefore, if exposure is made to a broad array of transmissions in an attempt to circumvent the locking system without authorization (knowledge of the correct unlocking transmission), the second lock may come into play causing the product to remain locked. The second lock may be engineered to respond to a field having frequencies falling within anti-hacking zones arranged to bookend the authorized profile so that scanning across the frequency band will produce substantial harm to the product.

Remote-activation locks of the present disclosure in some embodiments may be implemented as a separate module which may be affixed to the product desired to be protected and/or to any protective physical structure surrounding the product (such as a product blister pack). In an alternate embodiment, the remote-activation locks may be integrated into the product or product packaging.

Thus in embodiments, the remote-activation locks provide security by requiring the application of a magnetic, electrical or electro-magnetic field having a prescribed profile (that is, for example, based upon the composition of the lock adhesive system) to effect the lock/unlock functions. The configuration of the remote-activation lock, and its constituent lock elements, determines the field profile required for operation. The configuration of each lock, or group of locks, may be designed to respond to a unique profile, the characteristics of which are kept secret, thereby implementing a secure "key" for the lock. The prescribed profile may include, without limitation, specification of field type, frequency, field strength, power level, and time waveform characteristics. For some embodiments sequences of fields, each having a different profile, are anticipated as attributes of the key. Alternatively, or in addition, the simultaneous application of multiple fields, each having a different profile, may be required as a key. An additional element of the key may be a requirement for specific physical orientations of the application of the field key.

The use of advantageously selected transmissions as a secure key, necessary to unlock a lock (and/or lock a lock), can result in not requiring physical contact with the product, the lock, or even the external product packaging, to cause a change in the lock state. For embodiments employing non-optical field security keys, the remote-activation locks need not be visible outside the exterior packaging. The lack of need for physical contact, for unlocking, also facilitates control of potential contamination of the protected product.

The remote-activation locks may also include features to defeat attempts to spoof (i.e., unauthorized unlocking) the lock. Examples of spoofing attempts may include exposure to environment or external fields not complying with the characteristics of the prescribed field profile. The lock may further comprise structural elements which inflict physical damage on the protected product in response to unauthorized attempts to physically (i.e., mechanically) remove the lock.

In one embodiment, there is disclosed a denial-of-benefits system wherein the product to be protected is attached by means of remote-activation locks assembly to an access blocking structure configured to prevent use of the product. The remote-activation locks may comprise an adhesive lock element that forms an adhesive bond between the product and the access blocking structure. The access blocking structure, when so bonded, may be configured such that unauthorized attempts at removal of the product result in irreparable damage to the product. Upon exposure to a field having the prescribed profile, the adhesive bond between the product and the protective structure is weakened thereby enabling safe removal of the undamaged product. For example, a cap may be bonded to a thumb drive or other USB portal accessory (or an electronic accessory interacting through another computer portal) such that the thumb drive and cap can not be separated, thereby preventing the interaction of the thumb drive with the computer portal. The cap may further be configured on its articulating surface with the thumb drive to have structure that would damage the thumb drive portal articulation portion if the cap was removed with any force. Thus activation of the lock with the correct field exposure would be important to allow access to the functionality of the thumb drive.

In an additional embodiment, the remote-activation lock comprises an adhesive lock element that forms an adhesive bond between the product and the conventional product packaging. The conventional product packaging may comprise, for example, jar or bottle caps, pump tops, blister packs formed by bonding a blister layer with a backing layer. Exposure to a field having the prescribed profile causes the adhesive lock element bond to weaken thereby permitting access to the contained product.

In another embodiment, a remote-activation lock system may be employed comprising multiple lock components. Such multiple lock components may include one or more component having a mechanical latching mechanism altered in latching effectiveness based upon the state of an adhesive positioned in respect of the mechanical latching mechanism so as to be able to affect whether the latch is latched or unlatched based upon the state of the adhesive. In one configuration, the mechanical latching mechanisms securely fasten an access blocking structure to the product to be protected. During initial lock installation, the mechanical latching mechanism is readily attachable to the product, but an unauthorized attempt at removal will cause irreparable damage to the product. Exposure to a field having the prescribed profile, causes the adhesive lock elements, installed within the lock assembly, to release the mechanical latching mechanism thereby freeing the undamaged product from the lock assembly.

In one embodiment, exposure to the prescribed field causes the adhesive lock element bond to completely release allowing separation without the application of additional mechanical force. In other embodiments, the adhesive lock element may be configured to only weaken, in response to exposure to the field, wherein additional external mechanical force must be applied to access the product. For example, the remote-activation lock may comprise a transmission sensitive adhesive with or without one or more energy distribution components (which may be energy converter components) that binds two parts a blister pack surrounding a product. By exposing the product within the blister pack to a transmission that activates the adhesive to a less adhesive state, the blister pack can now be much more easily opened by a consumer (avoiding the need to pull out the scissors and to cut the blister pack apart).

In yet another remote-activation lock of the present disclosure, there is made use of an electrically-releasable adhesive between two substrates capable of holding a charge. In one such embodiment, the electrically-releasable adhesive comprises polymers capable of adhering such substrates to a surface of the adhesive wherein at least one polymer is polar and at least one polymer is non-polar. Such electrically-releasable adhesive further may comprise one or more electrically conductive material, for example, selected from the group consisting of one or more of a conductive salt, metal particles, metal wires, nanowires, and carbon nanotubes. By appropriate selection of the polar and non-polar polymers and the electrically conductive material, one may provide an electrically-releasable adhesive composition that is capable of transitioning from a first state to a second state in response to the application of external electrical and/or magnetic energy ("electro-magnetic energy"). The external energy may be a specific profile of electro-magnetic energy such as an applied voltage. In an embodiment, the first state is a first adhesion state and second state is a second adhesion state, for example, wherein the first adhesion state has a different density than the second adhesion state.

An electrically-releasable adhesive may also be used in an embodiment remote-activation lock employing composite magnetostrictive and electrostrictive layers ("ME composite"). In such embodiment the adhesive comprises polymers capable of adhering such substrates to a surface of the adhesive wherein at least one polymer is polar and at least one polymer is non-polar. The electrically-releasable adhesive as above may comprise one or more electrically conductive material, for example, selected from the group consisting of one or more of a conductive salt, metal particles, metal wires, nanowires, and carbon nanotubes. The external energy used to lock and/or unlock may be a specific profile of electromagnetic energy. In an embodiment, the first state is a first adhesion state and second state is a second adhesion state, for example, wherein the first adhesion state has a different density than the second adhesion state.

In addition, in some embodiments, there may be no residual material left on the product after the remote-activation lock system has been released. In one non-limiting practical example, freedom from residue can be effected when an electrically releasable adhesive is subjected to a direct current or DC biased field, the product is conductive or features a conductive film thereon, the protection structure is conductive or features a conductive film thereon, and the product or its film and the protection structure or its film respectively serve as the anode (connected to the positive charge) and cathode (connected to the negative charge). In this example, after debonding the anodic surface may be free of adhesive residue, even when subject to micrograph inspection at greater than 500 power. In alternative embodiments, residual material may be left with the product after release. In an embodiment, a distinguishing mark may be integrated into the lock that becomes visible after the lock is unlocked. The distinguishing mark may, for example, be a phrase such as "Valid Proof of Purchase."

BRIEF DESCRIPTION OF DRAWINGS

The accompanying figures incorporated in and forming a part of the specification illustrate several aspects of embodiments of the invention and, together with the description, serve to explain the embodiments. In the drawings:

FIG. 22 is a schematic representation of a remote-activation lock unit embodiment employing an electrically releasable adhesive layer in two views, one view wherein the lock unit is in a locked position (FIG. 22 A) and the other view wherein the lock unit is in an unlocked position (FIG. 22 B)

caused by application of an applied voltage across two substrates flanking the electrically releasable adhesive layer.

FIG. 23 is a schematic representation of another remote-activation lock unit embodiment employing an electrically releasable adhesive showing an embodiment applied current profile.

Figure 24:
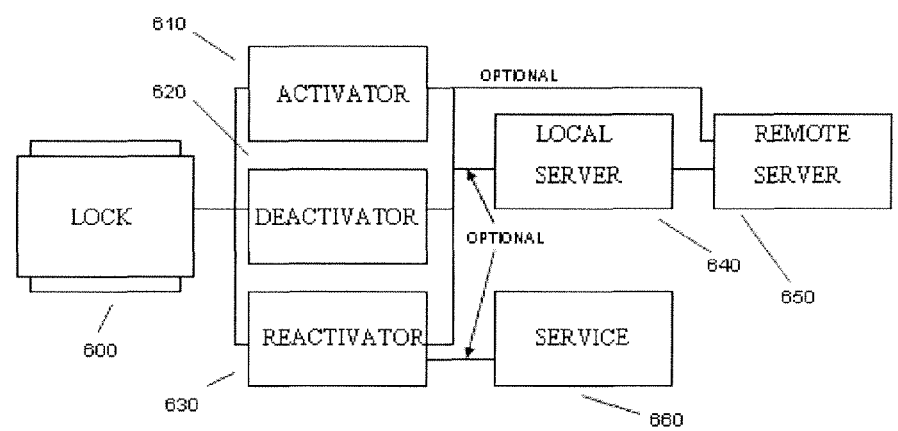

FIG. 24 shows a simplified embodiment of an architecture for a remote-activation lock system.

Figure 25:
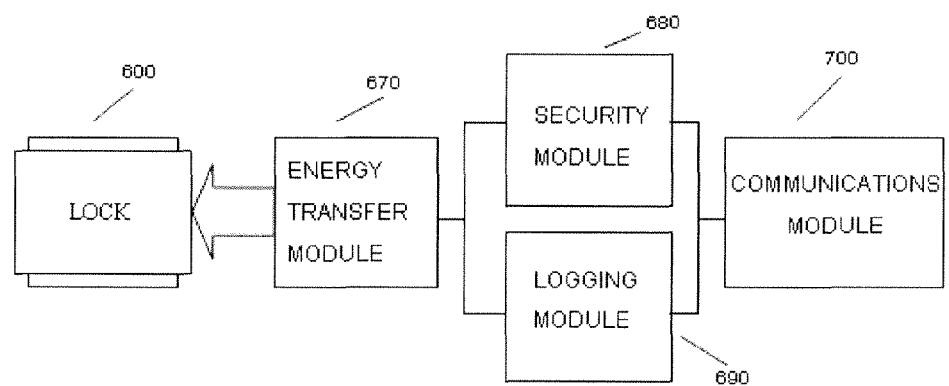

FIG. 25 is a simplified schematic of an embodiment of the system architecture of the activator, deactivator and reactivator process subsystems, each of which may share a common subsystem level architecture.

Figure 26A:
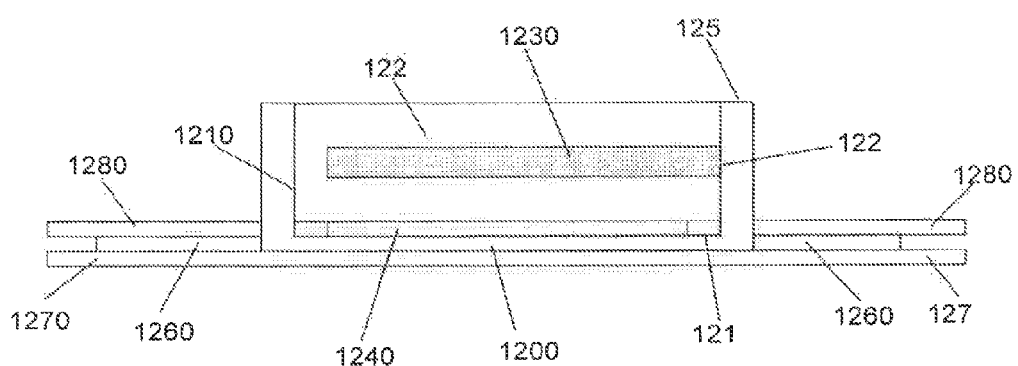
Figure 26B:
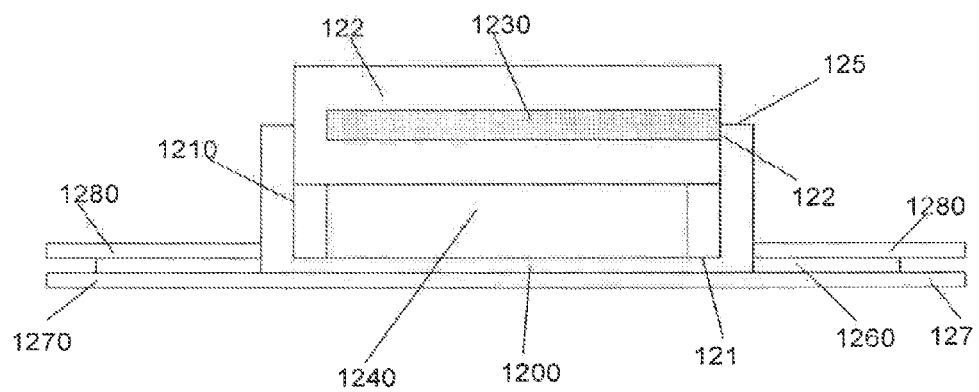

FIG. 26A is a schematic representation of an exemplary remote-activation lock assembly containing a memory card locked into the assembly. FIG. 26B is a schematic representation of an exemplary remote-activation lock assembly after it has been exposed to an external stimulus with an appropriate energy profile and subsequently unlocked.

DETAILED DESCRIPTION OF EMBODIMENTS OF THE INVENTION

In embodiments, there is provided a remote-activation lock assembly comprising one or more remote-activation lock components. The remote-activation lock assembly can be employed to prevent unauthorized access to a product by locking the use of the product or locking full-use of the product. In embodiments, the remote-activation lock assembly is physically attached to the product in a manner that prevents use/full-use of the product. In other embodiments, the remote-activation lock is part of structure that covers the product (such as blister packing material) or surrounds a part of a structure that limits access to the full benefit of the product. The remote-activation lock assembly may be implemented as a separate module coupled to the product itself or a structure coupled to the product. It may also form part of the product or product packaging that is, being integral therewith.

Lock components in embodiments may comprise one or more transmission activatible-adhesive and/or -non-adhesive lock elements. Lock components may further comprise mechanical mechanisms and structures that interfere with the use or full use of the product.

Lock assemblies may be designed such that upon activation with the appropriate energy, or profile of energies, 1) one or more locks associated with the assembly move from a locked state to an unlocked state, 2) one or more locks associated with the assembly move from an unlocked to locked state, and 3) one or more locks move from a locked state to an unlocked state, while at the same time, or at another time, one or more locks associated with the assembly move from an unlocked to a locked state.

In embodiments, actuation of each of the lock/unlock functions requires the application of a transmission, such as a field, or fields, having a prescribed profile, the prescribed profile serving as a secure key. The secure key may comprise, for example, one or a combination of magnetic, electric, electro-magnetic, optical, acoustic fields having a prescribed profile. The prescribed profile may include, without limitation, specification of field type, frequency, field strength, power level, and time waveform characteristics. For some embodiments sequences of fields, each having a different profile comprise components of the key. Furthermore, the simultaneous application of multiple fields, each having a different profile, may be required as a key. An additional element of the key may be a requirement for point or orientation of the application of the field key.

As would be understood by the disclosure herein, the configuration of the remote-activation lock, and its constituent lock elements, may determine the field profile required for operation. The configuration of each lock, or group of locks, may be designed to respond only to a unique profile, the characteristics of which may be kept secret, thereby implementing a secure key for the lock.

For remote-activation lock assembly embodiments providing an ordered sequence of lock/unlock operations, each operation of the sequence may require application of a unique field profile. The corresponding sequence of unique field profiles should be configured so that unique profiles, required earlier in the sequence, do not prematurely activate later sequence steps.

In embodiments, some (or all) of the lock functions may be activated, or alternatively activated, by a specified environmental condition. Examples of such conditions include, without limitation, temperature, humidity, acceleration, and force application.

A "building block" of a remote-activation adhesive lock embodiment may be a transmission activatible-adhesive, that is an adhesive that changes in chemical or physical properties ("chemicophysico properties") when exposed to a specified energy, which may be applied by a transmission. The change in chemicophysico properties should be of an extent that the change can be used to effect a change from a locked to unlocked state, or from an unlocked to locked state.

The adhesive material composition may be formulated to significantly change at least one of its physical properties (i.e., state change) in response to a particular energy, such as an energy transmission, such as an electrical signal, magnetic field, electromagnetic wave, light, or heat. Effected physical properties may comprise, without limitation, dimensions, volume/density, adhesion, and, tensile, compressive and shear strengths.

In embodiments, an adhesive lock element comprises an adhesive material composition integrated with an energy distributor and/or converter to form a composite structure. The integrated energy distributor helps to distribute the energy throughout the adhesive and may further act as converter transforming a specific externally applied energy (such as an electromagnetic wave) into a second type of energy (such as thermal energy) with the second type of energy being responsible, at least in part, for the change in state of the adhesive.

Remote-activation locks may be configured to provide any desired combination of locking/unlocking/relocking/anti-spoofing features by the employment of either single or multiple lock elements. The lock elements may be configured in parallel, where each grouping of elements forms its own interface between the surfaces, or in series, where the grouping of lock elements is configured as a sandwich between the surfaces. In some embodiments, a remote-activation may comprise both series and parallel grouping of lock elements.

Figure 1:
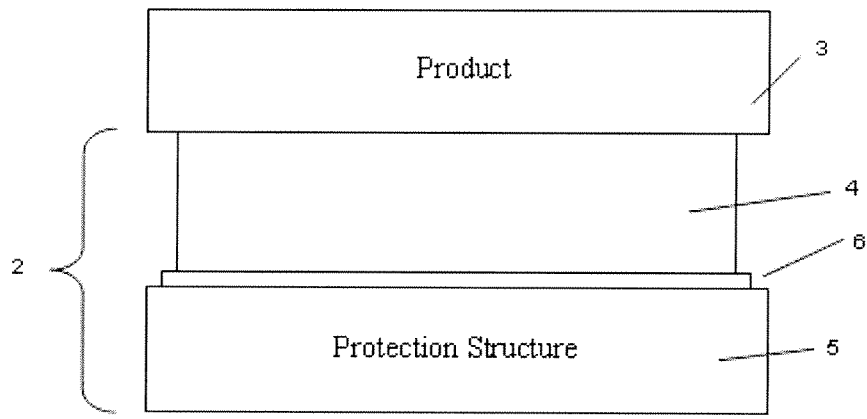
FIG. 1 is a simplified diagram of an exemplary adhesive lock element comprising a single energy converter substrate and forming a bond between a protected product and a protection structure.

Shown in FIG. 1, is one embodiment of a remote-activation adhesive lock element 2 that may be used in a remote-activation assembly. Remote-activation adhesive lock element 2 comprises a laminate of an adhesive material 4 bonded to a first carrier substrate 6 that acts an energy converter. First carrier substrate 6 may be, for example, a conductive metal sheet (such as a foil of aluminum, iron, steel, copper, gold, platinum) that conducts the energy to a surface of the adhesive material 4. Remote-activation adhesive lock element 2 is shown bonding a surface of product 3 along one surface of adhesive material 4 and to protection structure 5 along another surface of adhesive material 4. Exposure of first carrier substrate 6 to an externally applied field in such embodiment causes the flow of electrical eddy currents. The eddy currents are dissipated, as heat, by the resistance of the metal sheet. The dissipated heat raises the temperature of the adhesive material 4 which causes the adhesive to de-bond from product 3.

The field management and frequency response are managed by a suitable selection of particles and/or films which are effected by the changing magnetic field. These materials both redirect and also function by having eddy currents induced within. In particular, they have dramatically different reactions to fields of different strengths and frequencies dependent on the conduction of magnetic flux and skin depth of the induced currents and resistivity of the materials. When eddy currents are induced in first carrier substrate 6, the eddy currents may tend to flow near the surface of the sheet in accordance with the skin effect. The skin effect reduces the electrical cross sectional area of the metal sheet available for current flow to an average depth commonly designated as the skin depth. Skin depth is mathematically expressed as $\delta=(r/(\pi\mu f))^{1/2}$ wherein r is the resistivity, $\mu$ is the magnetic permeability, [H/m], and f is the frequency. These may be selected from known materials, as shown, without limit, in Table 1, alone or in combination. Selection may provide an aspect of the sensitivity to frequencies for adhesive keys. These materials may be selected as layers, films or particles. As a film they may advantageously be nominally between 0.0001" in thickness to 0.010" thickness or as a particle between 0.5% and 10% by volume of the adhesive. The wide variation in permeabilities of various metals indicates that the skin depth, and therefore the resistance, of the energy converter can be engineered by selecting the material comprising the metal film. The heat generated by eddy current flow may raise the temperature of adhesive material composition thereby causing a change in its properties (such as adhesion). The amount of heat generated, and the resulting temperature attained is, in part, determined by characteristics of the field, the thermal properties of the adhesive material composition and the electrical properties of the metal sheet. In addition, the physical shape and dimensions of the metal sheet may be configured to impart frequency selective characteristics and thermal distribution properties of the energy converter. An additional heating mechanism occurs for ferromagnetic energy converter materials. An externally applied alternating magnetic field causes the generation of heat from magnetic hysteresis. Hysteresis occurs as the elementary magnets within the ferromagnetic material seek to align with the externally applied reversing magnetic field.

TABLE 1

| Material | Permeability |
| --- | --- |
| Aluminum, Copper | 1 |
| Nickel | 600 |
| Steel | 2,000 |
| Iron | 5,000 |
| Purified Iron | 200,000 |
| Super Malloy | 1,000,000 |

When adhesive material 4 changes state in response to an electrostatic field rather than a thermal condition, such may be used to effectuate a change in the lock of protection structure 5 to product 3. For example, when an electrostatic potential is applied via the differential voltage in substrates 6 and 6', ionic transport may occur resulting in a reaction at the surfaces of adhesive material 4 that causes a decrease in adhesion. As a non-limiting example, a suitable electrically-releasable adhesive material for component 4 is EIC Laboratory's ER E-4 adhesive. In this example, the adhesive will typically debond from the anodic surface within 20 to 180 seconds when subjected to a potential difference of 9 to 50 volts DC. This period may be accelerated by embedding springs or similar devices within the adhesive, with care taken to ensure that the spring material does not short the electrical field or interfere with ion flow of the debonding process. Debonding may be prohibited by applying a voltage sufficient to cause a short between the two conductive surfaces. Such shorting would preclude application of a voltage gradient across the adhesive thereby rendering the adhesion permanent thereby thwarting hackers scanning or attacking the system. Where appropriate, one or a plurality of electrically releasable regions may be employed and controlled by simple intelligence, such as conventional, avalanche, or zener diodes, or by more intelligent switches such as an integrated circuit, in order to stymie hackers and prevent unauthorized access.

In an additional embodiment of release adhesive there is disclosed an electrically releasable adhesive comprising at least two polymers, at least one polymer that is polar and at least one polymer that is non-polar, and an electrically conductive material comprising one or more of the following materials: conductive salt, metal particles, metal wires, nanowires, and carbon nanotubes, and characterized by a transition from a first state to a second state in response to the application of external energy. The external energy may be a specific profile of electro-magnetic energy such as an applied voltage. In an embodiment, the first state is a first adhesion state and second state is a second adhesion state. The different states may, for example, be a change in the physical volume of the adhesive or in the adhesion strength.

Adhesive additives which can be particles or films are selected, without limit, from Table 2 to control thermal diffusivity which allows formation of part of a key by managing thermal energy transfer and by effectively establishing thresholds for the input energy. Thermal diffusivity may be mathematically expressed as $D=\lambda/(C_p\rho)$ wherein $C_p$ is the specific heat of the material, $\lambda$ is its thermal conductivity and $\rho$ is its density. Thus a very specific rate of energy and time is required to reach a particular thermal threshold given by a collective set of properties. The magnitude of the difference in properties means that small additions of material from 0.5% to 10% can make a substantial difference in performance.

TABLE 2

| Material | $\lambda$ | $C_p$ | $\rho$ |
| --- | --- | --- | --- |
| Aluminum | 235 | .9 | 2.7 |
| Copper | 400 | .385 | 8.96 |
| Iron | 80 | .449 | 7.15 |
| Epoxy | .25 | 1.67 | 1.25 |
| Wax | .25 | 2.9 | .9 |

In a further embodiment, there is disclosed a remotely controllable release adhesive system comprising: an ME (magnetostrictive/electrostrictive) layer and an adhesive layer comprising at least two polymers, at least one polymer that is polar and at least one polymer that is non-polar, and an electrically conductive material comprising one or more of the following materials: conductive salt, metal particles, metal wires, nanowires, and carbon nanotubes, and characterized by a transition from a first state to a second state in response to the application of external energy. Magnetostrictive is a property of ferromagnetic materials that causes them to change their shape or dimensions when subjected to a magnetic field. Electrostrictive is a property of all electrical non-conductors, or dielectrics, that causes them to change their shape under application of an electric field. The external energy may be a specific profile of electro-magnetic energy. In an embodiment, the first state is a first adhesion state and second state is a second adhesion state.

Figure 2:
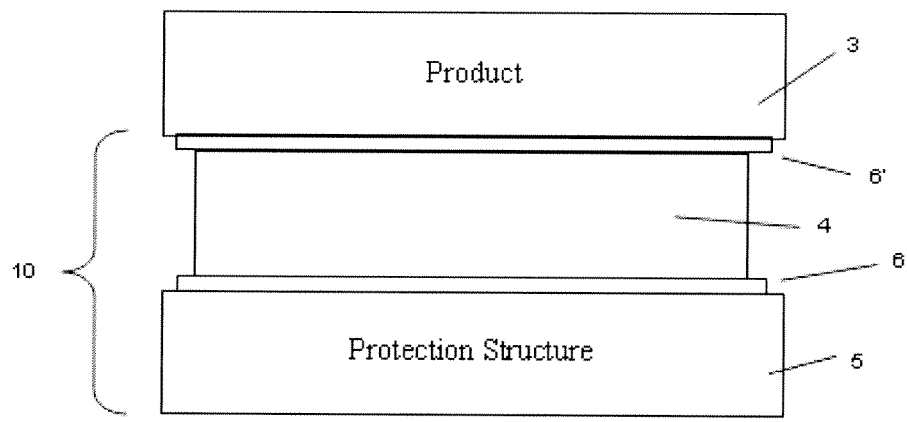
FIG. 2 is a simplified diagram of an exemplary adhesive lock element comprising dual energy converter substrates and forming a bond, prior to exposure to the prescribed field, between a protected product and a protection structure. In one embodiment, the dual energy converter substrates are configured to convert a voltage into an electrical field between the two substrates and across the interstice filled by an electrically releasable adhesive.

A remote-activation adhesive lock in another embodiment, as shown in FIG. 2, comprises two carrier substrates 6 and 6' which sandwich adhesive material 4 to form a sandwich remote-activation lock 10 with carrier substrate 6 being bound to protection structure 5, and protection substrate 6' being bound to product 3. When carrier substrates 6 and 6' are conductive substrates the two conductive substrates may act as an energy converter. This energy converter functions to provide either purely enhanced heating or in another implementation, an electrostatic field. The security key for the lock may be implemented by a prescribed field profile, which may be defined by physical and electrical properties of the energy converter in combination with the thermal properties and temperature related state change characteristics of the adhesive material 4.

An example of an adhesive material composition suitable for application in this embodiment adhesive lock element comprises an admixture of an adhesive and particles of non-adhesive material dispersed through the adhesive.

The actual adhesive is chosen based on a combination of the manufacturing and product lock requirements. For example, one "base" adhesive appropriate for use with a lock application is the Raymat 8303A UV cure acrylic pressure sensitive adhesive (manufactured by Raymat Materials, Inc. 30081 Ahern Ave, Union City. This adhesive is convenient because it is nominally a fluid and thus additional components can be conveniently added. It is applied as a liquid to a foil backing and ultraviolet energy used to effect a cure to a tacky state in a roll to roll processing system. A release liner which can be peeled off with just light force is attached. This release liner can be similar to a waxed paper or silicone film to which the adhesive will not strongly adhere. This permits easy assembly as a pseudo tape. This tape can now be conveniently used in a lock assembly in which it is securing a latch for example to which it strongly adheres. However, one could also use a base adhesive such as an epoxy-amine when convenience of attachment and assembly is not the issue but strength is of primary importance.

The particles dispersed through the adhesive may modify the properties of the adhesive material, help distribute the heat energy more effectively, and/or, provide an additional first energy source to second energy source conversion mechanism (such as from electromagnetic energy to heat energy conversion). In addition, other dispersed particles may exhibit a desired physical behavior, in response to the externally applied field. In an embodiment, the dispersed particles may serve to modify the thermal conductivity properties of the admixture either enhancing or retarding heat flow within the adhesive. Metal particles characterized by high thermal conductivity may enhance heat flow while non-metallic particles may retard heat flow.

In another embodiment, electrically conductive particles, having dimensions resonant at the externally applied field frequencies may function as energy converter elements. The electrically conductive particles, when excited by a resonant field, may, for example, generate heat via resistive dissipation of induced eddy current or frictional effects due to acoustic resonance of magnetic particles. In a further embodiment, the dispersed particles may physically expand in response to exposure to the externally applied field. Physical expansion of the dispersed particles would result in the mechanical fracturing of the adhesive lock element bond thereby releasing the lock.

In a further embodiment of FIG. 1, lock element 2 comprises an adhesive material 4 which in this exemplar case is characterized by lacking significant adhesiveness prior to exposure to a select external energy source, such as an external field profile. In this case, exposure to the select external energy causes an increase in adhesiveness of adhesive material 4 causing the adhesive to strongly bond protection structure 5 and product 3. In another embodiment of FIG. 1, adhesive material 4 is characterized by an initial volume x prior to exposure to a particular energy source and a larger volume of x+y (where y is greater than 0) after exposure to such energy source. The increase in volume may be associated with a fracture of the adhesive properties of the adhesive material 4, allowing release of lock 2 from product 3.

Figure 3:
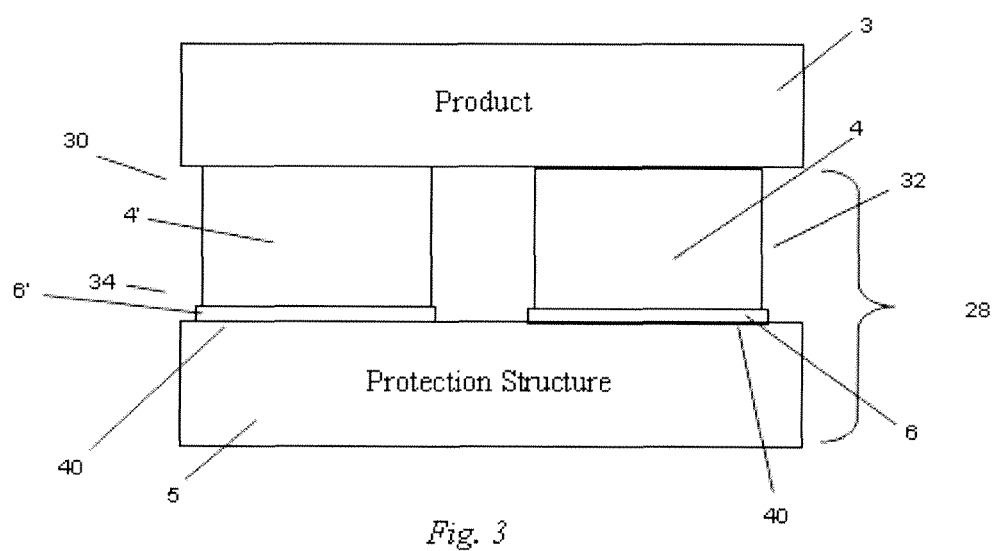
FIG. 3 is a simplified diagram of a Remote Activation Lock comprising two lock elements. The first, a first lock element, as shown in FIG. 1, may form a protected product/protection structure bond which may be unlocked by exposure to the prescribed field thereby safely releasing the product. The second lock element is an anti-spoofing type that, if exposed to a non-prescribed field, permanently and irreversibly bonds the product to the protection structure thus protecting the product from unauthorized access. In embodiments, more than two lock elements may be combined, in serial or parallel, to provide additional lock capabilities.

Shown schematically in FIG. 3 is a remote-activation lock assembly 28 comprising two lock elements 32, 34. Lock element 32 which bonds a surface of the product 3 to a protection structure 5 that prevents use of the product. Lock element 32 may be permanently attached to the protection structure 5 by means of a conventional adhesive 40. Non-limiting examples of suitable conventional adhesives include epoxies, and thermo-setting plastics. The bond between lock element 32 and product 3 is formed by energy-responsive state change adhesive material 4. The surface of product 3 to which the lock element 32 is bonded may be selected on that forced removal of the lock element 32 will result in damage that prevents use of the product 3. Lock element 34, comprising the second lock element, is positioned to form second physical interface between product 3 and the protection structure 5. Lock element 34 may also be permanently attached to the protection structure 5 by means of a conventional adhesive 40. The interface between the product 3 and lock element 34 is an energy-responsive state change adhesive material 4' which responds to an energy or energy profile that is different than energy-responsive state change adhesive material 4. Each remote-activation lock element 32 and 34 has an associated energy converter 6 and 6' configured to convert an externally applied energy to another energy (e.g., electromagnetic wave to heat). When one lock element is in locked position whereas another is in an unlocked position, remote-activation lock assembly 28 helps prevent illicit activation using broad spectrum transmissions (i.e., in an attempt to defeat the lock on the protected product). That is, if one lock element is designed to lock at one transmission, while abroad exposure to many transmissions may overcome the locked lock element, it may also cause the other lock element to lock the product such that it cannot be used, or fully used.

For example, product 3 may remain bonded to the protection structure 5 until the lock element 32 is exposed to the prescribed field profile. Upon exposure to the prescribed field profile, the lock element 32 bond is released thereby allowing the product 3 to be separated from protection structure 5, without damage. In the event that an unauthorized attempt is made to remove the product 3 by exposing it to a non-prescribed field profile, lock element 34 may be activated thereby forming a permanent bond between the protection structure 5 and product 3. For the situation where the non-prescribed field profile encompasses the prescribed field profile, the lock element 34 bond may prevent access to the product even if lock element 32 bond is released.

Figure 4:
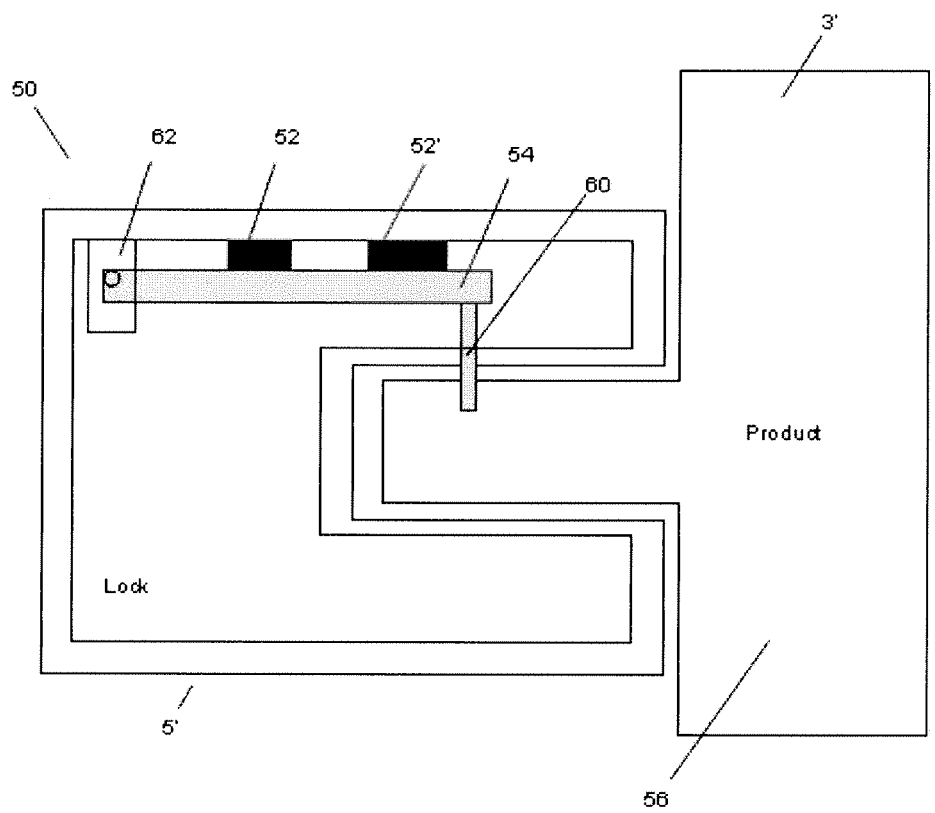
FIG. 4 is a simplified diagram of a Remote Activation Lock Assembly comprising a mechanical mechanism activated by one or more lock elements when exposed to a prescribed field.

As would be understood from the present disclosure, different structures can be articulated with the lock elements to effectuate a locking of the product. For example, a remote-activation lock assembly 50 embodiment using an articulating lever is shown schematically in FIG. 4. In such embodiment, remote-activation lock assembly 50 comprises multiple lock elements 52, 52' and mechanical mechanism lock components 54. Rather than forming adhesive bonds between the product 3' and a protection structure 5', lock assembly 50 is affixed to the product 3' by non-adhesive mechanical holding apparatus 60, in this case comprising a pin attached to a lever pivoted from a inner extension 62 from the housing of lock assembly 50. Other non-limiting exemplary holding apparati 60 may comprise, for example, extendable/retractable latches, pawls, pistons and/or pins that engage corresponding receptacles incorporated into the product. The mechanical holding apparatus 60 may be extended or retracted by operation of mechanical mechanisms comprising the remote-activation lock assembly 50. Adhesive lock elements 52 may be configured within the lock assembly 50 to actuate the component mechanical mechanisms when subjected to the prescribed field profiles. Actuation of the component mechanical mechanisms 62 causes the extension or retraction of the mechanical holding means 60 thereby allowing safe removal of the remote-activation lock assembly 50 from the protected product. Additional lock elements (not shown) may be configured, within the lock assembly, to prevent actuation of the component mechanical mechanism when exposed to non-prescribed field profiles.

Figure 5:
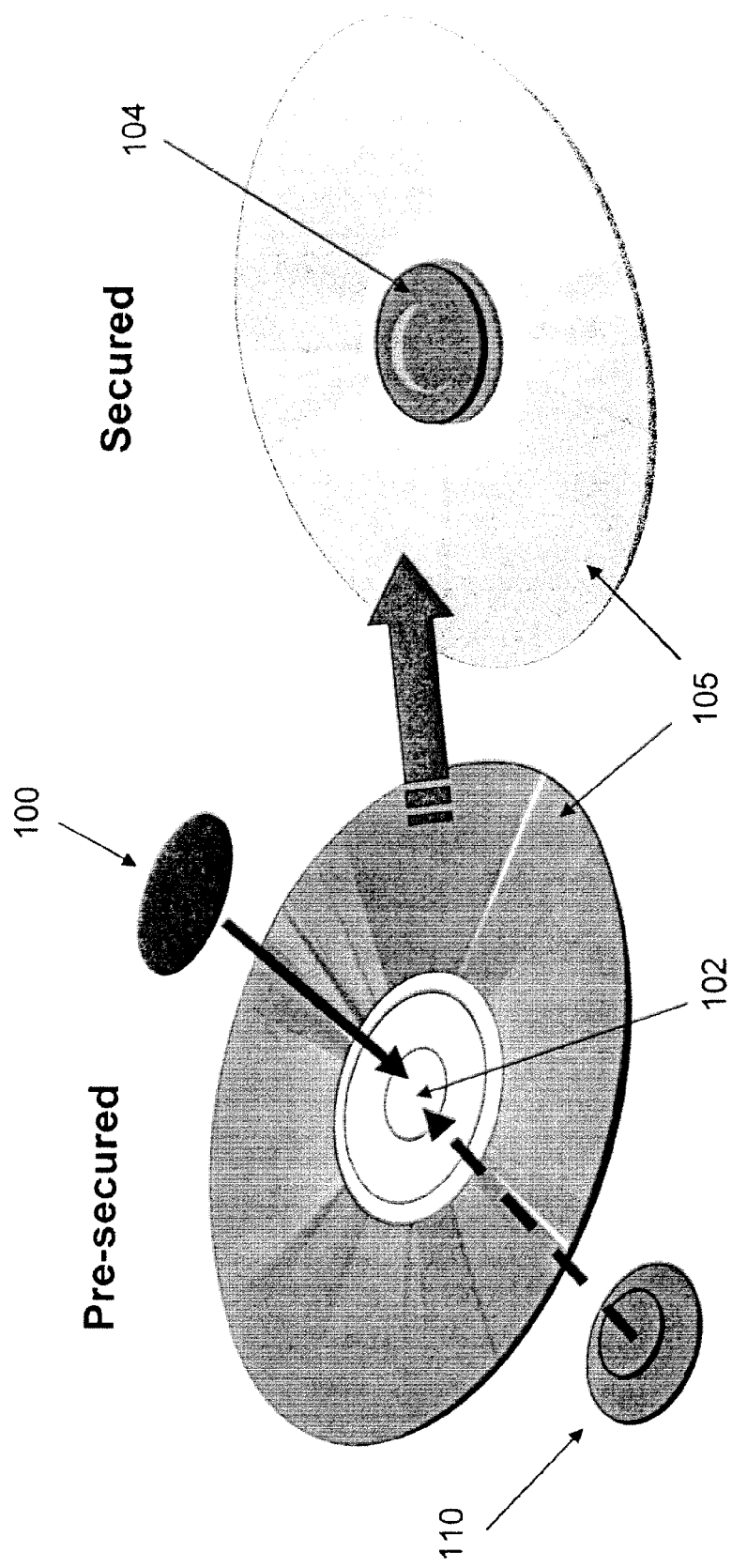
FIG. 5*a* is a pictorial representation of an optical disc, to be protected, and the components of a Remote Activation Lock Assembly.
FIG. 5*b* is a pictorial representation of an optical disc, to be protected, with the Remote Activation Lock Assembly installed.

In yet another embodiment, there is disclosed a remote-activation lock assembly suitable for protecting products such as DVDs, CDs, and other recording media. FIG. 5a illustrates one such recording medium lock remote-activation lock assembly system wherein two lock caps, 100 and 110, act as protection structure. As shown, caps 100 and 110 are configured to engage through center opening 102 of optical disc 105. FIG. 5b shows the locked remote-activation lock assembly 104 secured into the center opening 102 of optical disc 105, that is, with its two caps 100 and 110 interlocked.

Figure 6:
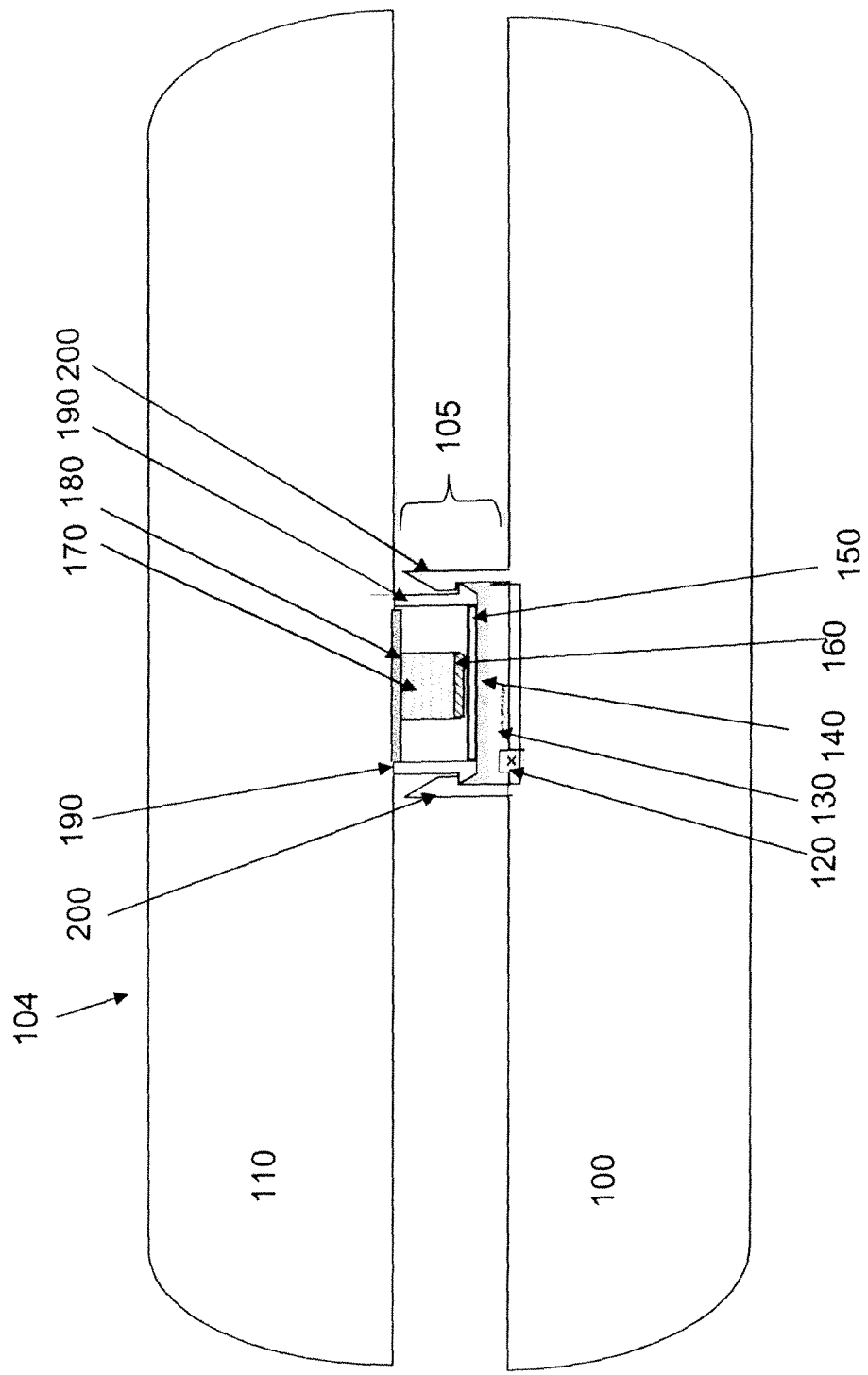
FIG. 6 is a schematic representation of a cross section cutaway of the Remote Activation Lock Assembly showing engagement between the component caps.

FIG. 6 shows a possible locking assembly for lock caps 100 and 110. In such exemplar remote-activation locking assembly 104, caps 100 and 110 each have an interacting mechanical mechanism 190 and 200. As exemplified in the drawing, there is seen an interacting spring-loaded latch system. Lock assembly 105 includes such interlocking mechanical mechanism 190 and 200, in conjunction with a number of other elements. Such other elements, as depicted, include a permanent adhesive composition 120 located inside the mechanical locking assembly 105 which is depicted as planar and adjacent to the surface of cap 100. A first energy converter 130 is located above the permanent adhesive composition 120 and inside the articulated locking mechanism 200. Lock assembly 105 further comprises a second layer of a state-change adhesive composition 140 located above the energy converter 130 and is also inside the mechanical locking mechanism 200. State-change adhesive composition 140 is an adhesive that undergoes a state change upon exposure to a certain energy source profile which has been selected for locking or unlocking of the lock, while permanent adhesive composition 120 is an adhesive that is designed to keep adhesiveness irrespective of the energy profile used to unlock the lock. Cap 110 comprises a mating mechanical lock component 190, as exemplified by a mating spring-loaded latch. As depicted, cap 110 also has a layer of permanent adhesive composition 180 located inside mechanical locking mechanism 190, which as depicted is planar and adjacent to the surface of cap 110. Cap 110 further comprises a protruding elevator 170, shown in the drawing as a cylindrical knob whose diameter is smaller than mechanical lock component 190 and is located adjacent to the permanent adhesive composition 180. Adjacent to the bottom of protruding elevator 170 (that is, at the side closest to cap 100) is another layer of a state-change adhesive composition 160. A second energy converter 150 is adjacent to state-change adhesive material composition 160.

Permanent adhesive compositions 120 and 180 may be the same adhesives but need not be. Exemplary adhesives include Raymat Materials Inc. 368, 468, or 568 epoxies. Energy converters 130 and 150 may be conductive foils or films including, but not limited to, aluminum and steel, or magnetic materials with specific magnetic characteristics such as magnetic permeability and Curie temperature. An exemplary representative magnetic material is 1010 Steel. State-change adhesive material compositions 160 and 140 may be epoxies that are the same as or different from adhesive material compositions 120 and 180, but altered in composition (for example, including materials that expand in volume upon application of a particular energy profile, thereby breaking the adhesive bonds of the adhesive) to allow for state change upon application of the desired energy profile, allowing tailoring of the locking mechanism to the particular application.

Lock component 190 of cap 110 fits inside the locking component 200 of cap 100 so the two may mechanically interlock. Lock components 190 and 200 are fastened together with state-change adhesive material 140. There is a significant area of epoxy between caps 100 and 110 providing an essentially unbreakable bond. For example, an 8,000 psi adhesive material spread over a 0.25" bond area may require 2,000 lbs of force to break apart.

Figure 7:
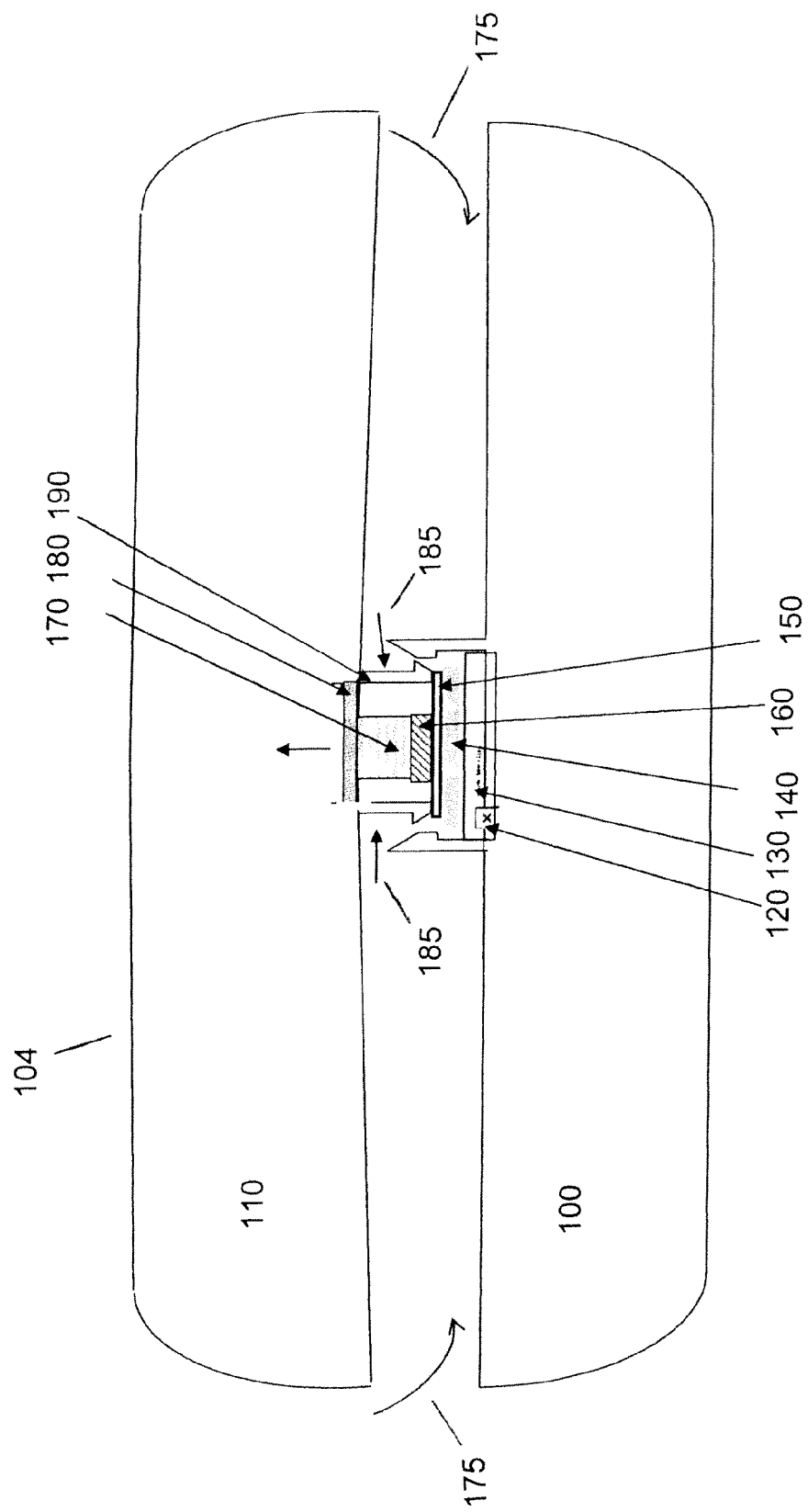
FIG. 7 is a schematic representation of a cross section cutaway of the Remote Activation Lock Assembly illustrating the unlocking of the lock.

As shown in FIG. 7, exposure to a field having the prescribed profile causes the remote-activation lock assembly 104 to unlock. In an exemplary embodiment, the first lock cap 100 comprises the state-change adhesive composition 140 that delaminates from the inner surface of mechanical locking mechanism 200 and the bottom outer surface of mechanical locking mechanism 190 when a predefined energy profile is received, such as, for example, a certain temperature is attained. The required energy profile to cause a known state-change in state-change adhesive composition 140 may act by conversion of one energy field to another, such as conversion of an intercepted electromagnetic field into thermal energy by way of energy converters 130 and 150. As depicted, energy converters 130 and 150 are layers laminated onto the opposite surfaces of adhesive material composition 140. Energy converters may entail, for example, electrical conduction, thermal conduction, electrical generation (magnetostrictive/electrostrictive), thermal generation (induction), and/or optical transmission.

The mechanism of unlocking locked lock caps 100 and 110 is schematically shown in FIG. 7. Second lock cap 110 comprises a state-change adhesive material composition 160, which expands when subjected to a field having a prescribed energy profile. Energy is delivered to adhesive composition 160 by energy converter 150. Expansion of adhesive material composition 160 applies a vertical force to cylindrically shaped elevator 170, forcing the elevator into cap 110, and bending the sides of cap 110 down as shown by the arrows 175. The bending of cap 110 creates a horizontal force that moves the inner locking mechanism 190 inward as shown by arrows 185. Cap 110 can now be separated from cap 100.

Figure 8:
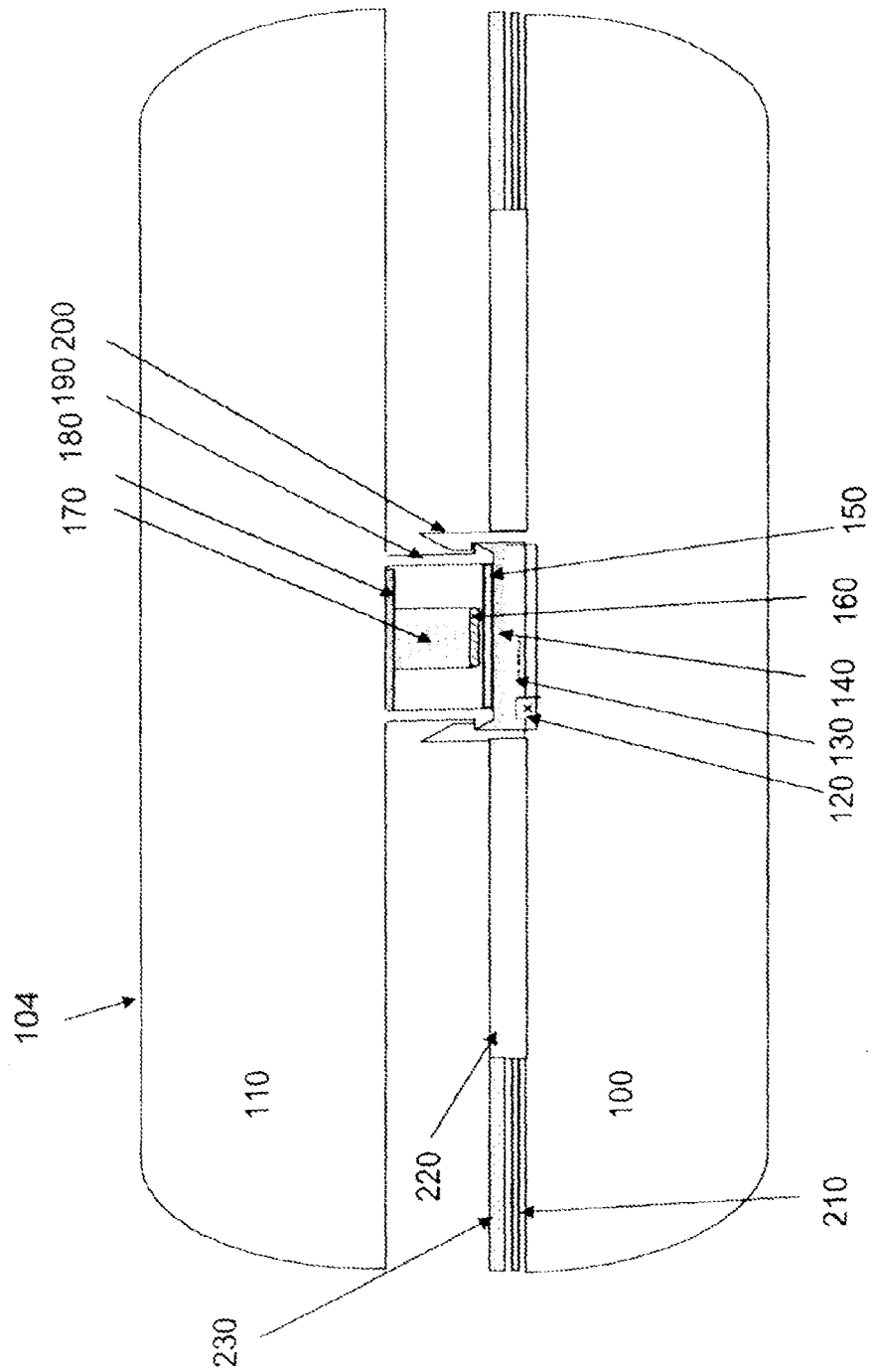
FIG. 8 is a schematic representation of a cross section cutaway of the Remote Activation Lock Assembly indicating additional anti-spoofing lock elements.

Additional lock elements may be added to provide anti-spoofing features of the remote-activation lock assembly of FIG. 6 as shown in the embodiment depicted in FIG. 8. As depicted in this embodiment, additional lock elements comprise: a third energy converter 210 having, for example, by a donut shape, in direct contact with the surface of cap 100 and located at the outer diameter of cap 100, another layer of state-change adhesive composition 230 located directly above the energy converter 210 layer, and yet another layer of state-change adhesive composition 220 contiguous with the two other layers 210 and 230, but located closer toward the inner diameter of cap 100.

Adhesive material compositions 220 and 230 may comprise hot melt adhesives that cure and harden at a specific temperature. Third energy converter 210 may comprise a foil or a film that is deposited by any variety of methods such as plating, sputtering, or others and is a conductive or magnetic material. State-change adhesive compositions 220 and 230 and energy converter 210 are configured so that they do not change state in an appreciable manner when exposed to the energy profile intended to unlock the lock. For example, such compositions may not heat to the temperature required to cure and harden when subjected to the field prescribed for authorized unlocking of the remote-activation lock. Exposure to a field of sufficient power that is not compliant with the prescribed field, however, causes the hot melt adhesives 220 and 230 to permanently bond to the disc, permanently locking the apparatus to the disc, and preventing its use.

Figure 9:
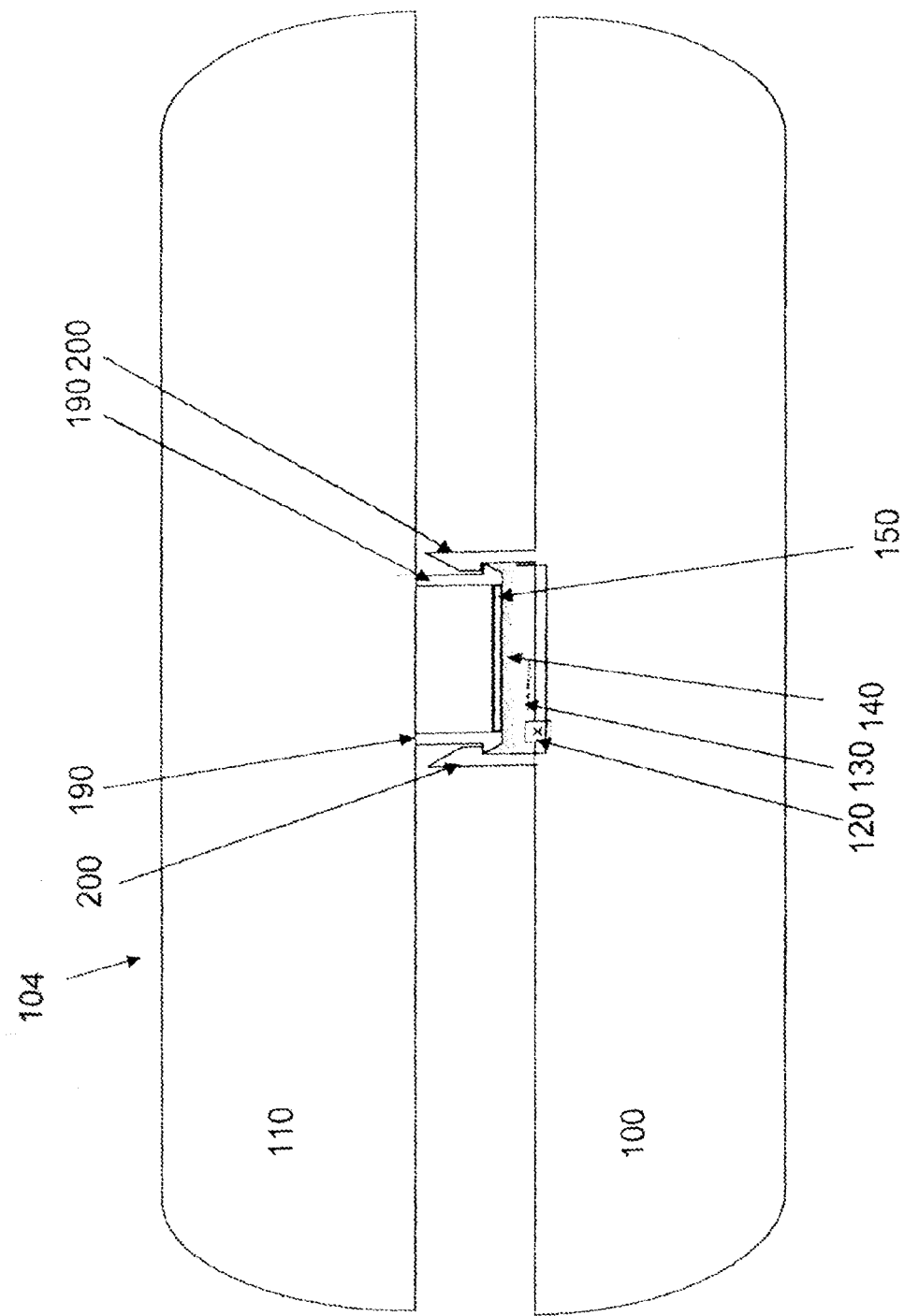
FIG. 9 is a schematic representation of a cross section cutaway of the Remote Activation Lock Assembly illustrating an alternate embodiment where the elevator has been replaced by an adhesive lock element.

Other embodiments of the remote-activation lock encompassed within this disclosure include, without limitation:
- As represented in FIG. 9, the cylindrically shaped elevator 170 may be eliminated and replaced by adhesive.
- Unlocking of the remote-activation lock could comprise a single method of actuation, for example, either by delamination of an adhesive material alone, or by expanding adhesive material alone.
- The remote-activation lock could comprise one energy converter 130 instead of two, i.e., 130 and 150.
- Energy converter 130 may be integrated with cap 100 eliminating the need for adhesive material composition 120. The energy converter layer could be deposited on cap 100 by plating, sputtering or any other method.
- Cylindrically shaped elevator 170 may comprise an integrated energy converter that is deposited by sputtering or any other method rather than a conductive foil.

Remote-activation lock assemblies of the present disclosure also include such assemblies suitable for use in protecting components and equipment comprising a connection jack or socket, access to which is required for use of the component or unit.

In one such embodiment, the remote-activation lock physically locks onto one or more USB (Universal Serial Bus) connectors of an electronic device so as to block the insertion of a mating USB connector necessary for operation. The Remote-activation lock Assembly, when locked to the protected device, would require the application of damaging force for unauthorized removal of the lock from the connector(s). In an embodiment, unauthorized attempts at unlocking the Remote-activation lock may render the locked connector unserviceable.

Figure 10:
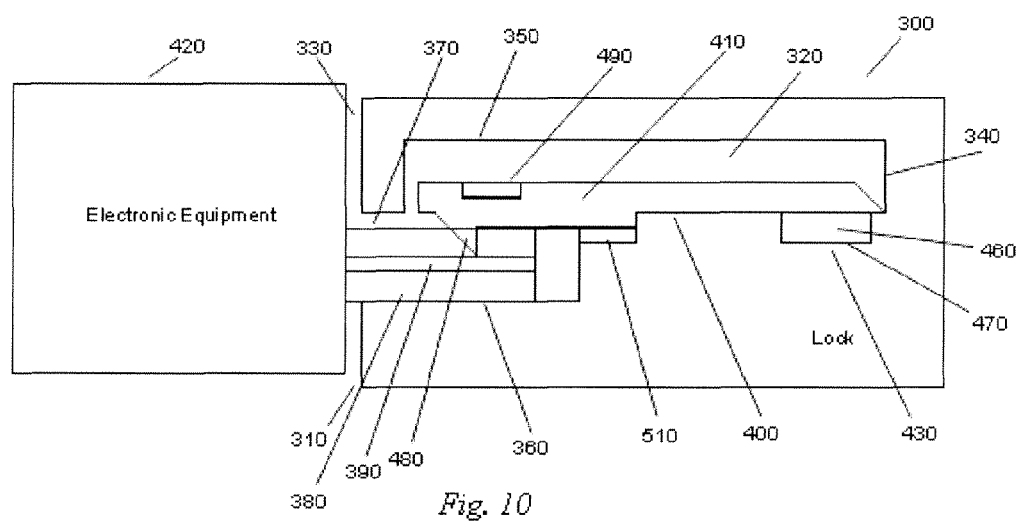
FIG. 10 is a simplified schematic cross section cutaway diagram of a Remote Activation Lock Assembly locked to the USB connector of protected electronic equipment.

FIG. 10 presents a simplified schematic representation of an embodiment of such connection jack or socket remote-activation lock assembly 300. Such embodiment is suitable for use protection of electronic equipment comprising one or more USB connectors. Remote-activation lock assembly 300 comprises an apparatus housing 310 that is a hollow box-like structure that defines an internal cavity 320 and comprises a planar front wall 330 and a parallel planar rear wall 340, two side walls, and a ceiling 350 and a floor 360. The planar front wall 330 defines a rectangular aperture 370 that penetrates the front wall 330 into the interior cavity 320 and is dimensioned to permit insertion of the terminal portion 380 of a USB connector 390. An elevated platform 400 is located within the interior cavity 320 and forms a surface parallel to the floor 360 extending from the planar rear wall 340 toward the front wall 330. A latch 400, comprising a latch lever or pawl 410, is hingedly attached within the interior cavity 320 near the intersection of the platform 400 and the rear wall 340 and operatively configured to assume at least two positions. In a closed position, the latch lever 410 is parallel to the platform 400 and engages the terminal portion 380 of an inserted male connector so as to prevent separation of the remote-activation lock and the connector 390. In an open position, the latch lever 410 is pivoted away from the platform 400 so as to disengage the head of the latch lever 410 from the terminal portion 380 so as to permit the safe removal of the Remote-activation lock Assembly 300 from the connector 390.

In operation, terminal portion 380 of USB connector 390 is inserted into the aperture 370 of the apparatus housing 310. In the locked state, latch lever 410, which may be spring-loaded, is latched to two holes in the terminal portion 380 of USB connector 390. In the locked state, excessive pulling (>100 lbs.) will force USB connector 390 to separate from USB housing body 420. The excessive force will force the latch lever 410 to rotate and bind into and scratch the copper traces in the terminal portion 380 of male USB connector 390 rendering them unusable. USB connector 390 may be safely removed only by the proper application of the prescribed energy profile.

The position of the latch lever 410 is controlled by three lock elements, 430, 440 and 450, each of which may be individually activated when subjected to corresponding fields having predefined profiles.

Authorized access to the protected equipment may be provided by the Releasable Lock Assembly 300. The first lock element 430 is affixed onto the platform 400, under the latch lever 410, and comprises a first adhesive material composition 460 that expands when subjected to a field having a first prescribed profile. The first lock element 430 further comprises an energy converter 470 which applies transformed energy to the first adhesive material composition 460 when excited by field having the first prescribed profile. The first lock element 430 is configured so that expansion of the first adhesive material composition 460 applies a force to the latch lever 410 driving it upwards from the closed position to the open position.

Figure 11:
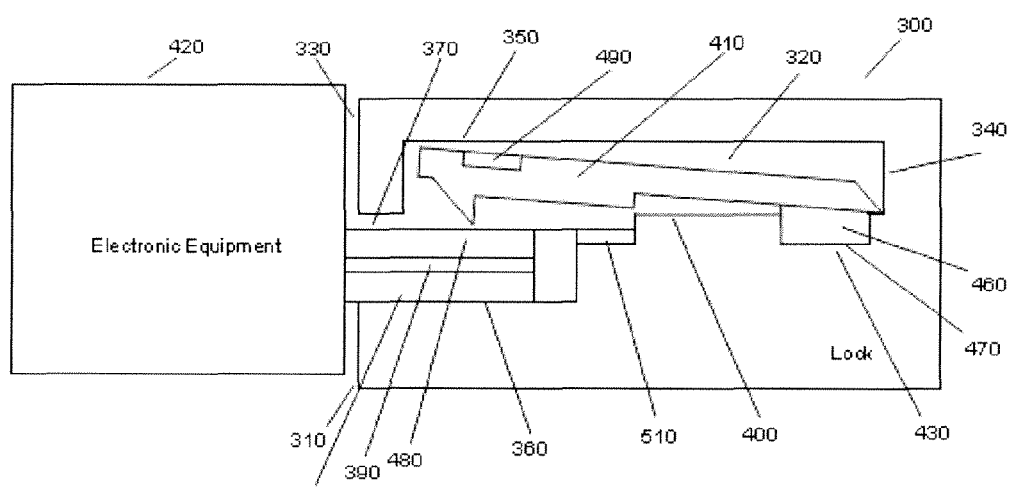
FIG. 11 is a simplified schematic cutaway diagram of a Remote Activation Lock Assembly that has been unlocked from the USB connector of protected electronic equipment.

Referring to FIG. 11, there is shown the embodiment of FIG. 10 wherein a field having a prescribed first profile is applied to cause unlocking of the latch lever 410. The activation energy is received by energy converter 470 causing adhesive material composition 460 to expand, raising the latch lever head 480 so that terminal portion 380 of USB connector 390 may be safely removed. Application of a field having the first prescribed profile does not cause significant transformation of energy by energy converter 490 therefore not effectuating change in the properties of adhesive material composition 500.

Figure 12:
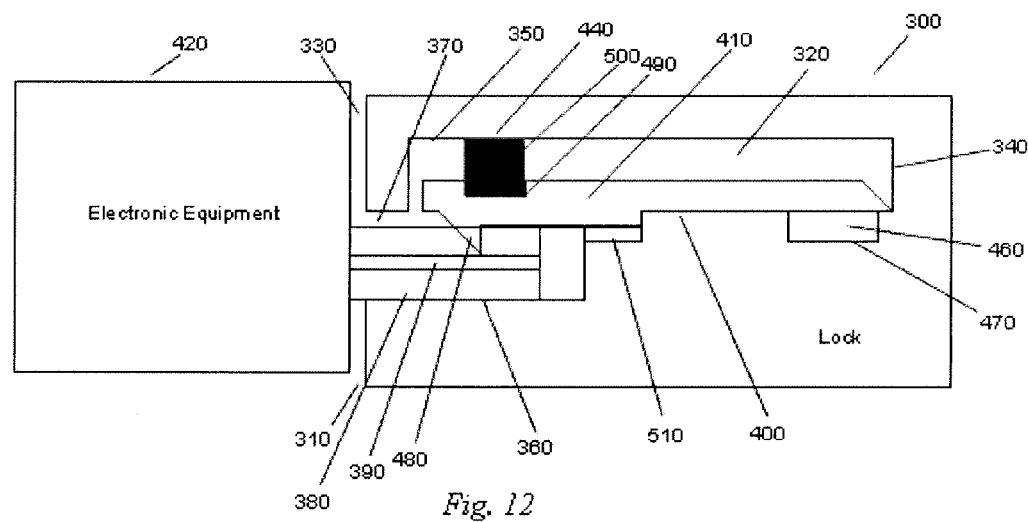
FIG. 12 is a simplified schematic cross section cutaway diagram of a Remote Activation Lock Assembly locked to the USB connector of protected electronic equipment. An expanded lock element located top of the latch lever is shown, after activation by a non-prescribed field or condition, as may result from an unauthorized attempt to unlock the lock.

Unauthorized access to the protected equipment may be prevented by additional lock elements as shown in the embodiment FIG. 12. A second lock element 440 is located on the latch lever 410 above the latch lever head 480 and comprises a second adhesive material composition 500 which expands when subjected to a field that is non-compliant with the first prescribed profile. The second lock element 440 further comprises a second energy converter 490 that provides transformed energy to the second adhesive material composition 500 when excited by an externally applied field that is non-compliant with the first prescribed profile. The second lock element 440 is configured so that expansion of the second adhesive material composition 500 causes the second lock element to contact the internal surface of the ceiling 350 thereby exerting a downward force to the latch lever 410 driving it toward the closed position. The magnitude of force developed by the second lock element 440 is greater than that of the first lock element 430 thereby overcoming the force exerted by the first lock element 430. Activation of the second lock element 440 maintains engagement of the latch lever head 480 pawl thereby preventing the safe removal of the remote-activation lock assembly 300 from the protected device.

Figure 13:
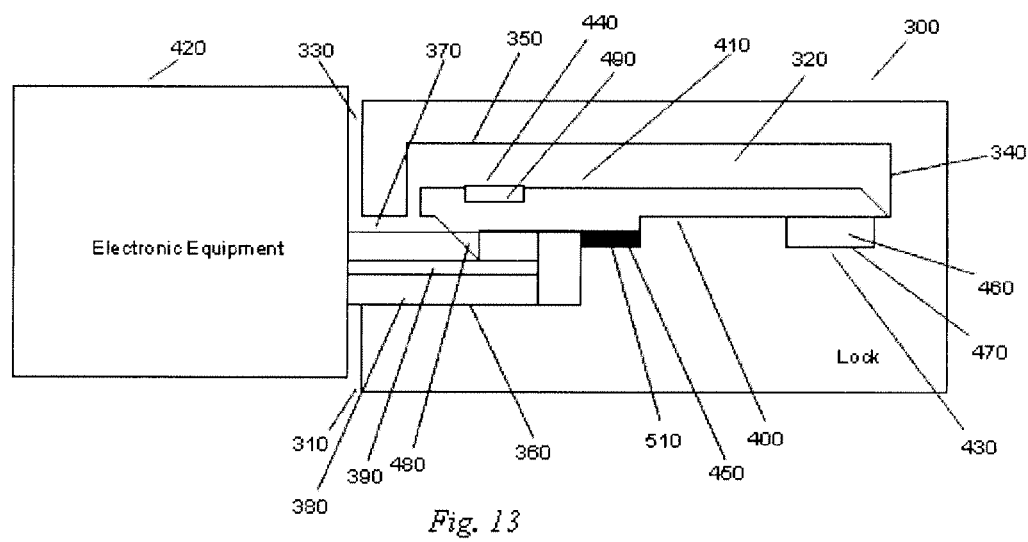
FIG. 13 is a simplified schematic cross section cutaway diagram of a Remote Activation Lock Assembly locked to the USB connector of protected electronic equipment. An adhesive lock element located below the latch lever is shown forming a bond between the latch lever and the platform, thereby preventing safe removal of the lock assembly.

As shown in FIG. 13, additional lock elements may be used for protection against broad-spectrum energy transmission assault. As shown, third lock element 450, is provided which may further prevent unauthorized access to the protected equipment. Lock element 450 is located adjacent to the platform 400, under the latch lever 410, between the second lock element 440 and the front edge of the platform 400 and comprises a third adhesive material composition 510. The third adhesive material composition 510 may be, for example, a thermal setting adhesive. In its initial state the third adhesive material composition 510 has not been subjected to its curing temperature and does not exhibit significant adhesive properties. If external energy is applied to the third adhesive material composition 510, the third adhesive material composition 510 cures, permanently bonding the latch lever 410 in the closed position. The adhesion of the third adhesive material composition 510 is sufficient to overcome the force exerted by the first lock element 430 thereby keeping the latch lever 410 in the closed position and maintaining engagement of the latch lever head 480 pawl. Subsequent exposure to fields having any profile will not allow the safe removal of the remote-activation lock assembly 300 from the protected device.

Figure 14:
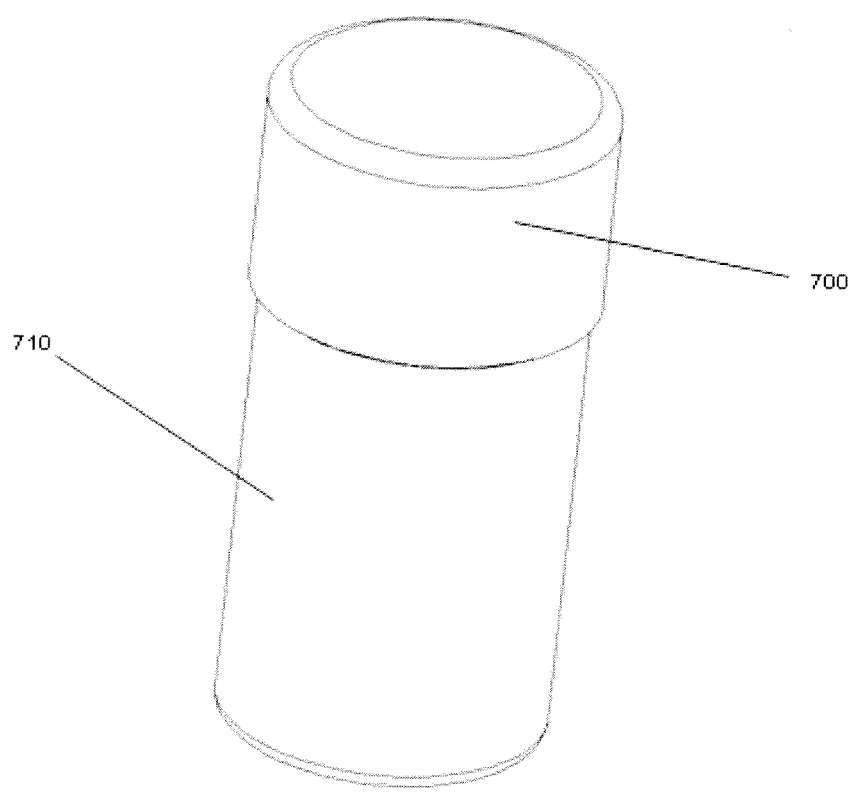
FIG. 14 is a simplified schematic diagram of a remote-activation lock system designed to protect the contents of a screw top container suitable for prescription drugs.

FIG. 14 illustrates an external view embodiment of a remote-activation lock system designed to protect products packaged in screw top containers such as prescription drugs. The system comprises a screw-top cap 700 which may be screwed onto a container 710. Without limitation, the container 710 may be made of glass or plastics such as polyethylene, polypropylene, polystyrene, polycarbonate, PET and may be fabricated by molding or forming.

Figure 15A:
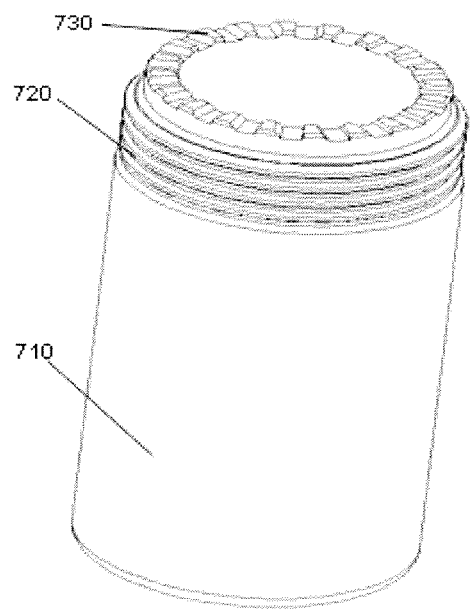
FIG. 15 is a simplified portrayal of a container with a screw-on container top incorporating the elements of a remote-activation lock.
Figure 15B:
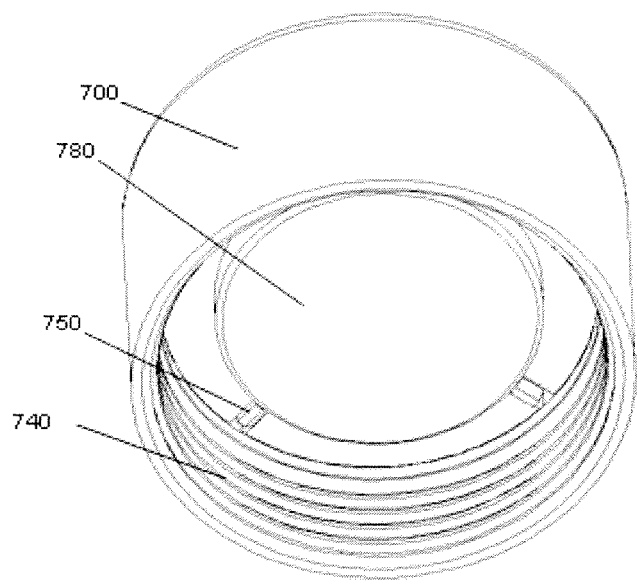

FIG. 15 illustrates the locking features of the remote-activation lock system. FIG. 15A shows the container 710 with external threads 720 on one end of the container as well as axially extending ratchet members 730 on the same end of container 710. Ratchet members 730 may be fabricated by molding. FIG. 15B shows the interior of screw-top cap 710 with internal threads 740 located along the inner wall of the screw-top cap and locking members 750, which are part of a ratchet pawl located on the upper portion of the interior of the screw-top cap.

Figure 16:
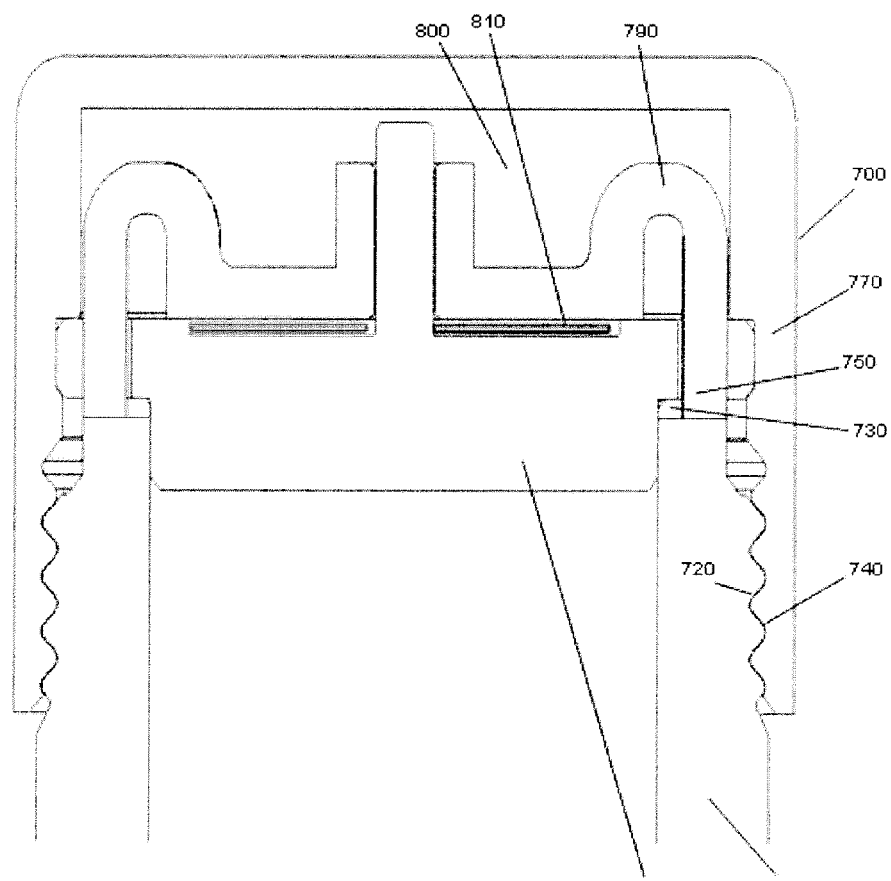
FIG. 16 is a simplified cross sectional representation of the container of FIG. 15 in a locked state.

FIG. 16 provides a detailed cross-sectional view of the exemplary remote-activation lock system for screw-top containers in a locked state. Screw-top cap 700 comprises a one-piece cap structure 770 formed of either molded plastic, metal, or ceramic materials and having internal threads 740. The internal threads 740 are dimensioned to engage the external threads 720 of the body of container 710 and therein engage lid 780 and ratchet pawl 790. The center of cap structure 770 contains a groove to accept and capture the ratchet pawl assembly comprising lid 780 and movable ratchet pawl 790. An upper cavity 800 allows the movement of the ratchet pawl during the unlock process and, in certain embodiments, contains an anti-tampering layer that will activate if an unauthorized attempt is made to access the contents. Lid 780 and ratchet pawl 790 are bonded together by adhesive 810. Adhesive 810 which is planar to the stationary lid 780 may comprise an energy converter or a layer or structure that contains one or more of thermally expanding, thermally conducting, or RF susceptor particles.

As screw-top cap 700 is twisted, threads 740 engage the corresponding threads 720 on container 710, and the ratchet pawl locking members 750 on screw-top cap 700 engage the ratchet members 730 on the neck of container 710. Ratchet pawl locking members 750 allow one-way rotation of the closure 700 to tighten only, and prevent loosening of the screw-top cap 700.

Figure 17:
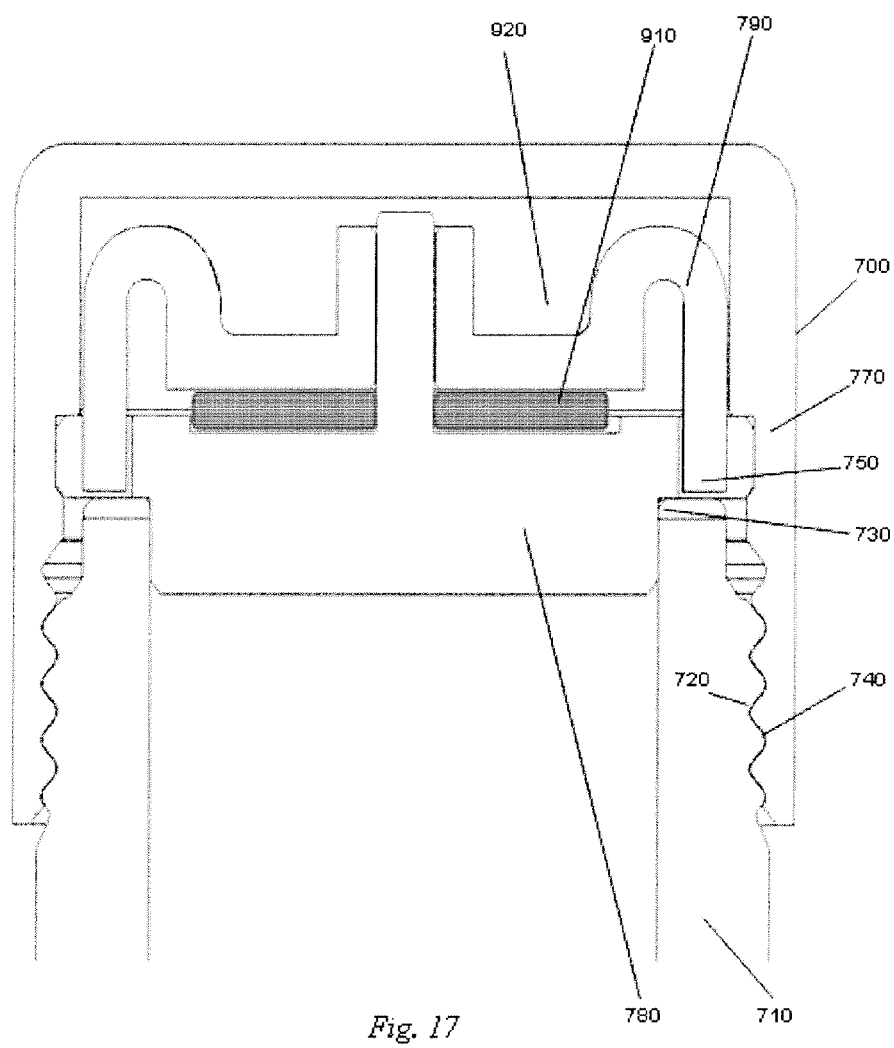
FIG. 17 is a simplified cross sectional representation of the container of FIG. 15 in a unlocked state.

As shown in FIG. 17, when container is exposed to a field having the prescribed profile, the adhesive expands, creating a force in a vertical direction. The generated force pushes ratchet pawl 790 away from lid 780, and thereby disengaging the ratchet pawl locking members 750 from the ratchet members 730 on container 710. Screw-top cap 700 may then be removed.

In some embodiments of the present invention, anti-tampering material may be added as a coating to the top of the ratchet pawl 790 in the area of cavity 800. The anti-tampering material may consist of EVA (ethyl vinyl acetate) or another formulation of adhesive. If there is an attempt to tamper with the locking device on the container using high heat or an inappropriate energy profile, it would activate the anti-tampering layer which may either melt the EVA, which would bond the ratchet members and pawl together, or in the case of an anti-tampering adhesive would be formulated to have a larger force than the lower adhesive therefore have a net force downward towards the bottom of the container, to keep the pawl and the gear engaged.

In other embodiments of the invention, the remote-activation lock system may be configured to use radially extending ratchet and pawl members. Additional embodiments may also include ratchet members on the exterior surface of the container adjacent to the exterior threads that work cooperatively with a ratchet pawl of an appropriate design.

Figure 18:
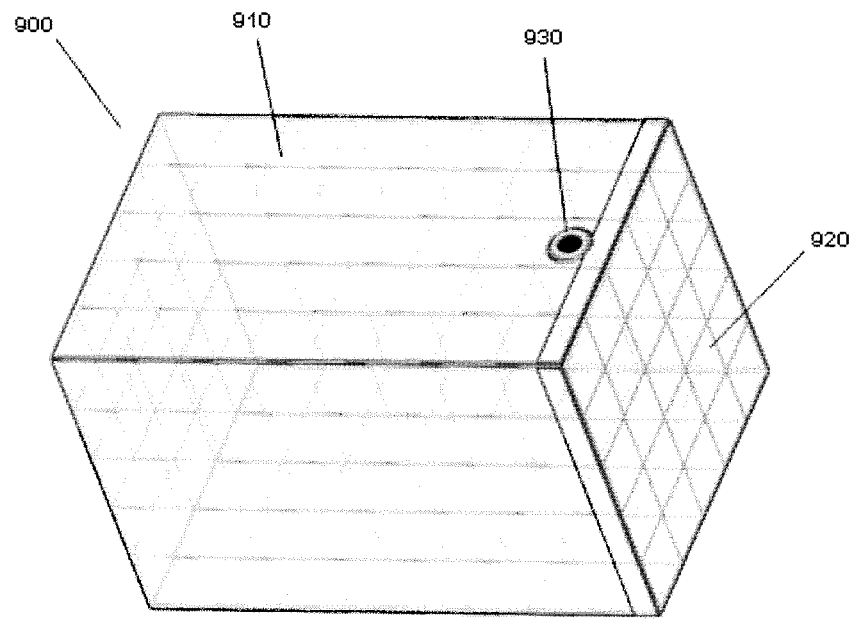
FIG. 18 is a simplified diagram of a remote activation lock configured as a mesh container.

In a further embodiment, FIG. 18 illustrates a remote-activation lock protected container designed to protect high theft risk items that are packaged in an arbitrary shaped container. The packaging 900 may comprise a box shaped or any other shaped container made of material with an embedded cut-resistant mesh 910. The packaging 900 may, without limitation, be made of fabric, paper or plastic. The mesh 910 may be fabricated from of any of the following, without limitation: stainless steel, Kevlar, any other tough polymer, or any other cut-resistant material. The mesh may or may not be visible to the external environment, and may be sandwiched between two or more layers of packaging material. The exemplary container in FIG. 18 includes a lid 920 that is sealed to the top edge of packaging 900 and incorporates a remote activation locking mechanism 930.

Figure 19:
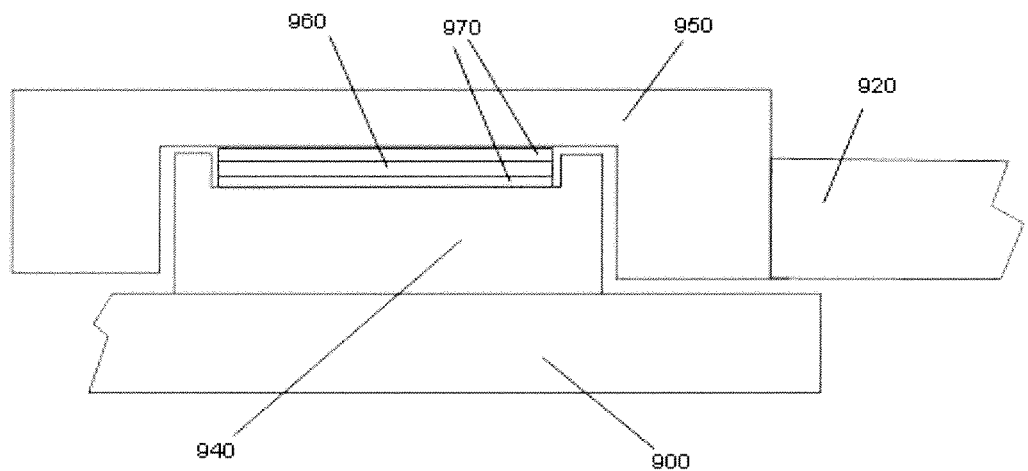
FIG. 19 presents a schematic representation of the remote activation lock mechanism incorporated in the mesh container of FIG. 18.

FIG. 19 provides a detailed cross-sectional view of an exemplar remote-activation lock mesh container locking mechanism 930 in a locked state. Locking mechanism 930 comprises a bottom pad 940 that is attached to packaging 900 using adhesive or any other fastening method and a cap 950 that is attached to container lid 920 by adhesive or any other fastening method. Bottom pad 940 has a slight recess, into which is placed an energy converter 960 which may comprise, without limitation, a foil or laminant of foils made of Aluminum or Copper or any other conductive material which generates eddy currents and thus converts energy in the presence of an electromagnetic field. Energy converter 960 has adhesive 970 on both of its planar surfaces to bond it to bottom pad 940 and cap 950, with one or both sides containing an expandable adhesive. The adhesive layer is planar to the bottom of the recess in bottom pad 940. The expandable adhesive may comprise a layer or structure that contains one or more of the following particles: expanding, thermally conducting, or RF susceptor particles. Such susceptor particles absorb the RF energy and may include ferrite powder, metal powders, carbon black, graphite powders, amorphous metal powders or coated particles such as glass fiber, glass bubbles, or mica flakes coated with a thin continuous metal film, all of which may include optional polymers, such as thermoset polymers.

In other embodiments of this invention, there may be an additional mechanical attachment between the cap 950 and bottom pad 940 such as a latch, which can be actuated by the expanding adhesive.

When the container is exposed to a field having the prescribed profile, energy converter 960 absorbs energy from the remote electromagnetic field and transmits energy into the adhesive. Adhesive 970 is also absorbing energy. The adhesive expands, creating a force in a vertical direction, and pushing cap 950 away from container 900, thereby allowing access to the seal that joins lid 920 to container 900. The seal can then be peeled off and lid 920 may then be removed.

Figure 20A:
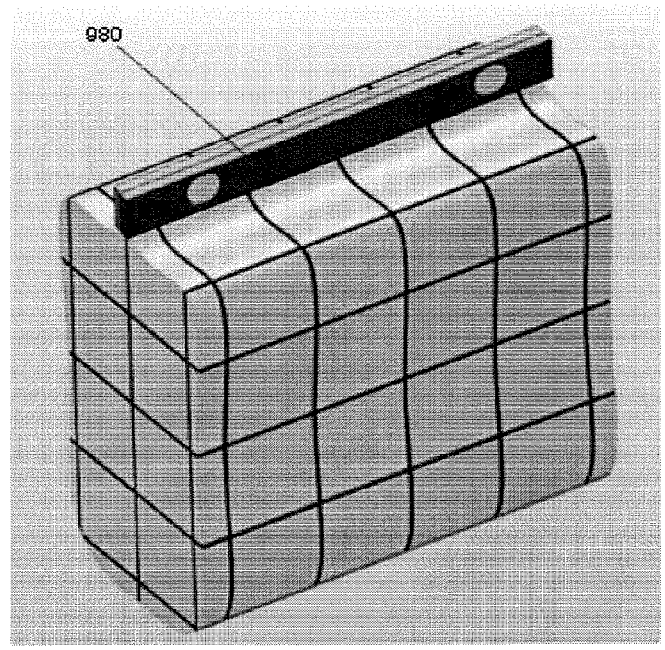
FIG. 20 illustrates two remote activation lock mesh container embodiments.
Figure 20B:
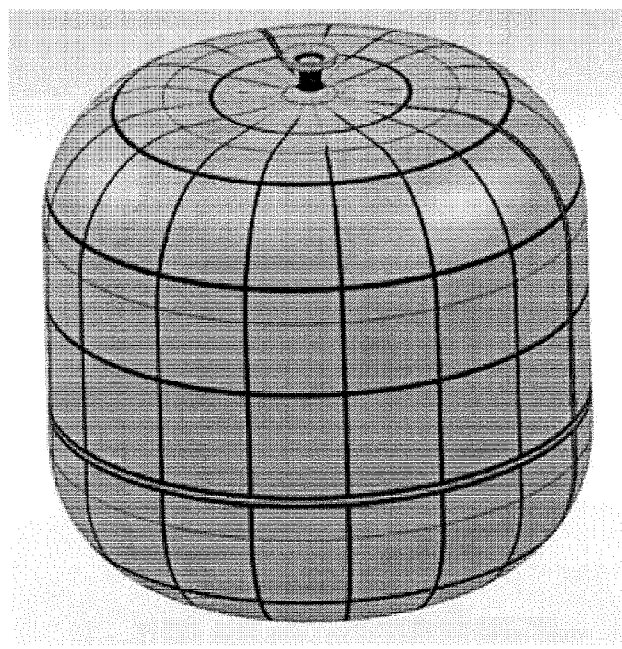

FIG. 20 illustrates two additional embodiments of the present invention. FIG. 20A shows a bag made of embedded mesh material which seals via two metal or plastic bars at the top of the bag. FIG. 20B shows a bag made of embedded mesh material with an expandable opening created by a wire that threads through the mesh at the top of the bag. The two wire ends are embedded in a locking mechanism similar to the one detailed in FIG. 19.

Figure 21:
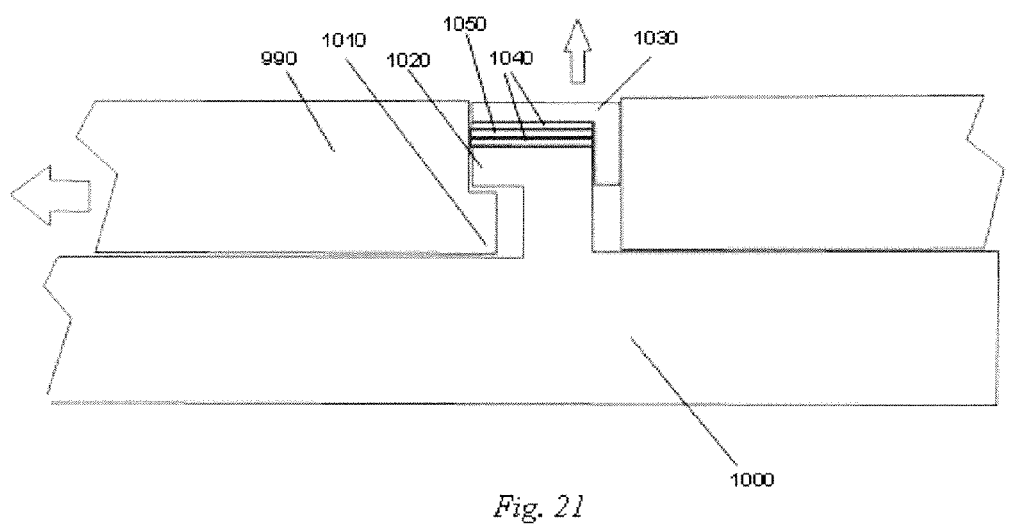
FIG. 21 presents a horizontal cross sectional view of a schematic representation of the remote activation lock mechanism incorporated in the mesh container of FIG. 18.

FIG. 21 shows a horizontal cross-section of the locking mechanism 980 for the container in FIG. 20A. Locking mechanism 980 comprises two metal or plastic bars, a first bar 990 which has an extending member 1010 and a second bar 1000 which has a hook or latch 1020 designed to receive extending member 1010 and which may be fabricated by embossing or machining or any other suitable method. First Bar 990 and second bar 1000 are pressed together and first bar 990 is made to slide so that its extending member 1010 engages with the hook or latch 1020 of second bar 1000. Cap 1030 is glued so that it covers the engagement area between extending member 1010 and hook or latch 1020. There may be one or more engagements along the bar such as the one described between extending member 1010 and hook or latch 1020.

When the bag is exposed to a field having the prescribed profile, energy is induced in energy converter 1050 by the prescribed field. The energy in energy converter 1050 transfers to the adhesive 1040, which is also absorbing energy. Adhesive 1040 expands, creating a force in a vertical direction as shown by the arrow, and pushing cap 1030 away from hook or latch 1020, thereby allowing bar 990 and extending member 1010 to slide away from hook or latch 1020 on bar 1000 as shown by the left facing arrow, which disengages the two.

Prescribed Field Profile

The operation of the remote-activation assembly lock requires the application of one or more fields having prescribed profiles. Unlocking or relocking a remote-activation lock assembly or group of remote-activation lock assemblies requires knowledge of the field profile particular to a given configuration of locking elements. The profile definition may comprise, without limitation, one or more of specification of field type, frequency, field strength, power level, and time waveform characteristics. For some embodiments, sequences of fields, each having a different profile, are anticipated. Alternatively, or in addition, the simultaneous application of multiple fields, each having a different profile, may be required as a key. An additional element of the key may be a requirement for point or orientation of the application of the field key.

In an embodiment, the profile definition may be maintained in a data base that associates the profile definition with an index or article identifier. The article identifier may unique or, in some cases, for example to prevent hazardous collection of transaction data that may be interpreted as Personally Identifiable Information or PII as is well known to those skilled in the art, the article identifier may be nearly but not strictly unique. Collision rates may be sufficiently low as to have no significant operational consequence while preserving constituent's privacy. In addition, to enhance security, a given article identifier may be associated with more than one lock assembly profile. These various indicies are referred to as a unique article identifier. The unique article identifier may be obtained, for example, by reading an alphanumeric bar code, an RFID, or magnetically coded label attached to the product. The unique article identifier may further comprise readable indicia that record field exposure history. A non-limiting example of such indicia is a label partially printed using ink responsive to temperature increase which would result from exposure to an activating field. In another non-limiting embodiment, a unique article identifier may include ferromagnetic features that respond to the applied activating field.

In another embodiment, the unique article identifier may comprise an RFID (radio frequency identification tag) attached either to the product, the product packaging, or the remote-activation lock assembly. The RFID may comprise a memory containing the unique article identifier, required field profile definition and data describing previous remote-activation lock operations.

Remote-Activation Lock Adhesive Materials

In an embodiment, an adhesive material suitable for use in the remote-activation lock may comprise a base liquid adhesive into which may be incorporated thermally expanding particles, and/or RF-susceptible particles, and/or thermally conducting particles.

In the remote-activation lock, release may need to be rapid (for example, 2 seconds or less) and complete (clean) across the surface of adhesive. When using RF induction to generate a rapid release, and specifically with adhesives which often have poor thermal conductivity characteristics, temperature gradients develop. In addition, some remote-activation lock systems require operation in a narrow process window.

To address the problem of thermal gradients, thermally conducting particles may be dispersed within the adhesive help conduct the energy, for example thermal energy, generated by the energy converter film and/or RF susceptor particles. When the temperature of the adhesive reaches a certain point, the energy responding particles may be selected such that they dramatically increase in size, breaking the chemical bond between adhesive layer and an attached substrate.

The base liquid adhesive that makes up adhesive may be of any general class of polymers or polymer resins used in bonding such as epoxy, acrylic/methacrylic resins, two-part or one-part polyurethane, one- or two-part silicones, polyester, polyamide, polyurea, phenolic resins, melamine formaldehyde condensates, and/or alkyd resins or mixture thereof. The adhesive cures over time at a temperature that is lower than that which could release, and in some cases preferably at room temperature. It may be desirable to have adhesives with low thermal inertia and low specific heat up to the release point of the thermally expanding particles in order to have rapid heating.

The thermally expanding particles or liquid droplets may be inorganic particles such as ammonium carbonate, ammonium hydrogen carbonate, sodium hydrogen carbonate, ammonium nitrite, sodium borohydride, and azide compounds. The thermally expanding particles or liquid droplets may also comprise water, alkane chlorofluorides, e.g., trichloromonofluoromethane and dichloromonofluoromethane; azo compounds, e.g., azobisisobutyronitrile, azodicarbonamide, and barium azodicarboxylate; hydrazine compounds, e.g., p-toluenesulfonyl hydrazide, diphenylsulfone-3,3'-disulfonyl hydrazide, 4,4'-oxybis(benzene sulfonyl hydrazide), and allyl bis(sulfonyl hydrazide); semicarbazide compounds, e.g., p-toluoylenesulfonyl semicarbazide and 4,4'-oxybis(benzene sulfonyl semicarbazide); triazole compounds, e.g., 5-morpholyl-1,2,3,4-thiatriazole; and N-nitroso compounds, e.g., N,N'-dinitrosopentamethylenetetramine and N,N'-dimethyl-N,N'-dinitrosoterephthalamide.

The thermally expanding particles or liquid droplets may also comprise microspheres, heat-expandable fine particles prepared by the encapsulation of a gaseous component in a polymer shell. The gaseous component is released from its shell upon the application of thermal energy. Gas agents such as butane, propane, heptane and the like are preferred as the gaseous component due to ease of mixing operations. Commercially available heat-expandable fine particles, such as Expancel Microspheres™, may also be used. Additionally polystyrene-encapsulated water may also be used as a thermally expanding particle. As sold, the particles generally have a particle diameter of 1 to 100 micrometers, but it may be in embodiments that a narrower distribution of particle diameters should be employed. For example, a complete and effective release of the adhesive upon heat treatment may occur with fine particles having a certain average particle diameter of 5-40 um.

Tuning of the release temperature may be accomplished by changing the polymer shell surrounding a microsphere. Depending on the shell's composition, the microspheres may expand between room temperature to 200 degrees Celsius, but between 50-175 degrees Celsius may be preferred. The microsphere shell may be made of polymers such as thermoplastics including acrylonitrile butadiene styrene (ABS). Thermally expanding particles may increase by as much as 40 times in volume.

The thermally conducting particles may include metal such as copper or an inorganic such as glass. The copper particles are about 100 microns in diameter. An example of an RF susceptor particle is 10% $Zn_2Y$, which is available as FP130™ from the PowderTech Corp. The RF particles may also be magnetic, in which case, heating of the particles may occur mainly by magnetic hysteresis losses rather than eddy currents.

The energy converter which may be a film in construction may be a material that generates eddy currents in the presence of an alternating magnetic field. Conductor films or foils made of aluminum, 1010 steel, permanent magnet, of copper materials are suitable. In addition, magnetostrictive film subjected to alternating AC magnetic fields will have a varying stress field and also generate heat.

Other embodiments of the inductively releasable adhesive system include the addition of wax particles to adhesive. The wax particles may be incorporated into adhesive in various combinations with thermally expanding sphere, thermally conducting particles, and RF susceptor particles and should be a low % by volume. The wax particles may assist with release of adhesive from an attached substrate. Representative waxes include a paraffin wax with a melting point of 47-65 C, which is most desirable, but carnauba wax (melting point of 78-85 C) or bee's wax (melting point of 45 C) may also be employed. Other suitable waxes may have melting points that range from 165 to 240 degrees Fahrenheit.

FIG. 22 is a schematic representation of a remote-activation lock unit embodiment employing an electrically releasable adhesive layer in two views, one view wherein the lock unit is in a locked position (FIG. 22 A) and the other view wherein the lock unit is in an unlocked position (FIG. 22 B) caused by application of an applied voltage across two substrates flanking the electrically releasable adhesive layer. The electrically-releasable adhesive layer in such embodiment may permanently bond to substrate 1106 and substrate 1106'. Electrically-releasable adhesive 1141 comprises a liquid adhesive mixture of at least two polymers, at least one polymer comprising a polar polymer represented as 1142 and at least one polymer comprising a non-polar polymer represented as 1143, and an electrically conductive material, represented as 1144 comprising one or more of the following materials: conductive salts, metal particles, metal wires, nanowires, and carbon nanotubes.

The polar polymer may comprise, for example (without limitation), one or more of the following: polyether polyols, polyester polyols, polycarbonate polyols, or any other polar polyol, or amine-terminated polyols. The non-polar polymer may comprise, for example (without limitation), silicone polyols, fluorinated polyols polybutadiene polyols, carboxy terminated polybutadienes, isocyanate-terminated polybutadienes, and melainized polybutadienes.

As depicted in FIG. 22B, when the two substrates 1106 and 1106' are subjected to a suitable energy profile, for example, a voltage applied across the two substrates 1106 and 1106', positive charges accumulate on one substrate 1106, and negative charges accumulate on the other, 1106'. Within the adhesive, the polar molecules 1142, which have some electrons that are not covalently bonded, rotate and align with the applied field. The electrically-conducting material 1144 found within electrically-releasable adhesive 1141 may also be affected by the presence of the electric field. For example, if electrically-conducting material 1144 is a conductive salt, anions will migrate to the substrate with the positive charge, as depicted substrate 1106, and cations will migrate to the substrate with the negative charge, as depicted substrate 1106. Non-polar molecules 1143 will not rotate in the electric field since their electrons are covalently bonded. Consequently, there will be some phase separation within adhesive 1141 resulting in regions of higher electrical conductivity (polar) and regions of negligible conductivity (non-polar). The force created by the physical alignment of polar molecules 1142 with the field weakens the adhesion of adhesive 1141 and causes either substrate 1106 or 1106 to release, depending on the direction of the applied voltage and the specific electrically-conducting material 1144 found within electrically-releasable adhesive 1141. In this schematic representation, when the applied voltage causes polar molecules 1142 to align with the field, the polar molecules elongate and increase the thickness of adhesive 1141 (i.e., density decreases) located between substrates 1106 and 1106', creating a horizontal force inward, which weakens the bond between adhesive 1141 and substrates 1106 and 1106.

FIG. 23 is a schematic representation of another remote-activation lock unit embodiment employing an electrically-releasable adhesive showing an embodiment applied current profile. Electrically-releasable adhesive 1141 in this embodiment is flanked on one surface by electrostrictive layer 1148 which is flanked on its other surface by magnetostrictive layer 1109'. Such composite magnetostrictive/electrostrictive layers may be referred to as a ME structure. Again, the electrically-releasable adhesive layer 1141 may comprise polymers with at least one polymer being a polar polymer 1142 and a least another polymer being a non-polar polymer 1143. Electrically-conductive material 1144 may be found within electrically-releasable adhesive 1141, with electrically-conductive material 1144 comprising, for example (without limitation), one or more of: conductive salt, metal particles, metal wires, nanowires, and carbon nanotubes. By appropriate selection of the polar and non-polar polymers and the electrically conductive material, one may provide an electrically-releasable adhesive composition that is capable of transitioning from a first state to a second state in response to the application of external electrical and/or magnetic energy ("electro-magnetic energy").

Magnetostrictive layer 1109 may be, for example, an alloy that incorporates rare earth materials such as Terfenol-D, a specially formulated alloy of terbium, dysprosium, and iron that exhibits large magnetostriction at room temperature and at relatively small applied fields. Electrostrictive layer 1148 may be a piezoelectric layer and may comprise, for example, lead zirconium titanate (PZT), quartz or Rochelle salt. The ME structure may be comprised of a single magnetostrictive layer 1109 and a single electrostrictive layer 1148, or of numerous alternating magnetostrictive layer 1109 and electrostrictive layer 1148 so long as the field response of each layer affects its neighbors.

The external energy used to lock or unlock the remote-activatable lock units may be a specific profile of electromagnetic energy. In an embodiment, a radio frequency (RF) magnetic field with a frequency of from 30 KHz to 300 MHz may be employed. When an oscillating RF magnetic field is applied to the ME structure, magnetostrictive layer 1109 responds by changing, for example, some or all of its dimensions from those of its relaxed state with each cycle of the magnetic field, the oscillations creating oscillating deformations within each magnetostrictive layer. The adjacent or interleaved electrostrictive layer 1148 holds a certain shape in its relaxed state. When subjected to physical stress, the electrostrictive layer 1148 exhibits strain. The strain causes the electrostrictive layer 1148 to deform and produces a voltage differential. Thus, the application of a fluctuating magnetic field imparts an alternating voltage, and current, which can be rectified using a diode 1147 for example. Applied current is shown schematically in insert drawing of FIG. 2. Furthermore, oscillating at the mechanical resonant frequency of the structure provides greater voltage output for a given oscillating field input. Thereby providing a preferred frequency which may be the only frequency at which an actuatable voltage and current will be produced.

With the rectified voltage or current applied from electrostrictive layer 1148 to the substrate 1108, positive charges accumulate on substrate 1108, for example, negative charges accumulate on electrostrictive layer 1148 as depicted. Within the adhesive, polar molecules 1142, which have some electrons that are not covalently bonded, rotate and align with the applied field. Since the frequency of the alternating magnetic field is high, the polar molecules do not have the time to rotate back to their original state. The electrically conducting material 1144 found within electrically-releasable adhesive 1141 are similarly affected by the presence of the electrostatic field generated by the ME 46 structure. If the conducting material 1144 is a conductive salt, anions migrate to the substrate with the positive charge, for example 1108, and cations migrate to the surface with the negative charge, for example surface of 1148. Non-polar molecules 1143 do not rotate in the electric field since their electrons are covalently bonded. Consequently, there is some phase separation within electrically-releasable adhesive 1141 resulting in regions of higher electrical conductivity (polar) and regions of negligible conductivity (non-polar). The force created by the physical alignment of polar molecules 1142 with the field weakens the adhesion of electrically-releasable adhesive 1141 and causes either substrate 1108 or 1148 to release, depending on the direction of the applied voltage and the electrically-conducting materials 1144 found within electrically-releasable adhesive 1141.

A lock and key may be formulated as an additional anti-theft feature of such embodiment. For example, the composition electrically-releasable adhesive 1141 may be altered by changing the composition or volume percent of polar polymer 1142, non-polar polymer 1143, and the electrically-conductive material 1144 so that specific adhesive compositions and mixtures may be unlocked by specific predetermined energy profiles. Furthermore the unlock state can be detected from the change in structure stiffness and thus acoustic resonance which occurs due to the release of adhesive from the ME structure.

Remote-Activation Lock System Architecture

Now turning to FIG. 24, there is shown an exemplary architecture for a remote-activation lock system. Four principal subsystems and two optional subsystems are schematically shown:

As showing in FIG. 24, remote-activation lock 600 is a locking mechanism that hinders or prevents unauthorized use of the product. The lock may be affixed to the protected product rendering it useless unless the lock is properly removed. Further, unauthorized removal of the lock will permanently damage or destroy the product. Optionally, remote-activation lock 600 may have a Product Batch ID subsystem which securely provides information required for authorized unlocking.

Activator 610 is a mode for setting or locking. Remote-activation lock 600, is typically but not exclusively set at the point of manufacture via activation. Activation, in some embodiments, may be the pressure application of a lock element configured as an adhesive label, or may involve more complex physical or chemical changes to the remote-activation lock 600.

Deactivator 620 provides a means for unlocking remote-activation lock 600. Deactivator 620 is typically but not exclusively set at the checkout counter where the purchase of the protected product comprises unlocking the remote-activation lock 600 thereby granting unfettered access to the product by the purchaser. This step is sometimes termed deactivation.

Reactivator 630 provides the capability to reset remote-activation lock 600 to the locked state. Such reactivation may be performed when a product is returned and prepared for repurchase. This operation may be termed re-locking and reactivation. Reactivation may be accomplished in a backroom setting, as distinct from the checkout counter.

Each of the activation/deactivation/reactivation operations requires knowledge of the past history of operations already performed on the product. The performance of each operation may be written into an indicator device that permits the past history to be retrieved prior to an operation. Embodiments of suitable indicator devices comprise magnetic identification tags, thermal responding identification tags, and radio frequency identification tags incorporating a read-write memory.

Local Server 640 is an optional subsystem of the remote-activation lock system. The functions of the Local Server are:
i) To allow local communications between deactivators 620 and the local server 640 for deactivation authorization.
ii) To provide a locally centralized facility for collecting deactivator log activity and to prepare reports from the log data.

iii) To reduce wide area network communications throughput for transactional authorizations and database updates.
iv) To reduce the dependence on the wide area communications link for faster and more reliable operation.
v) To improve the security of the Deactivators 620 by placing their database information in volatile memory that may be blanked when the deactivator 620 is powered down. Upon power up, the deactivator 620 may be reloaded from the local server 640 database.

Remote Server 650 may be provided as a centralized source of various software items and data items. As the system grows and the reliance on the remote server 650 increases, the architecture may allow for synchronized and geographically separated remote servers 650 to share load, and provide for more fault tolerance in the overall system. Remote servers may include:
i) Firmware and software updates for the local servers 640, activators 610, deactivators 620, and reactivators 630;
ii) Centralized repositories for the deactivation database for download to local servers 640;
iii) Centralized repositories for deactivation databases for download to deactivators 620 if local servers 640 are not present;
iv) Individual transactional look ups in the deactivation databases if the deactivator 620 is optionally configured for no local storage of the deactivation database.

Also optional is service device 660 which may communicate with activator 610, deactivator 620, or reactivator 630. The service device 660 provides the following functions:
a) Provision of firmware and software updates to the activators 610, deactivators 620, and reactivators 630 in the absence of a local server 640 or connection to a remote server 650;
b) Provision of security data and lock formula data updates to the activators 610, deactivators 620, and reactivators 630 in the absence of a local server 640 or connection to a remote server 650.
c) Provision of requirements for initializing activators 610, deactivators 620, and reactivators 630 in the absence of a local server 640 or connection to a remote server 650 making them capable of their normal functions. This allows them to be shipped or stored in an un-initiated unusable state;
d) Provision of requirements for decommissioning Activators 610, deactivators 620, and reactivators 630 in the absence of a local server 640 or connection to a remote server 650 making them incapable of their normal functions while being shipped or stored;
e) Provision of requirements for downloading service log data for tracking performance, maintenance, or security issues;
f) Provision of requirements for diagnosing problems with activators 610, deactivators 620, and reactivators 630.

The three processes, activation, deactivation, or reactivation, may be accomplished by a single device capable of responding in all three modes, separate devices for each mode, or other combinations of modes. In a single- or multi-mode device, security measures control which modes are available at any given time. For example, the deactivator mode may only be available when a wired, conventional wireless, or wireless mesh network indicates that at least some members of a set of neighboring deactivators which are expected to be present are also available, thus preventing solo operation of a deactivator that has been stolen or removed from a store. A deactivator may be directed to enter an installation or device-training mode to learn about its environment, and it may subsequently be directed to operate only when expected environmental factors are present. Representative factors for this feature include WiFi and cellular telephone signatures, geo-coding via TCP/IP addresses and radio spectrum signatures, lighting and temperature patterns, presence detection of RFID authentication tags embedded in or near checkout facilities, presence of smart cards, and related tokens, atomic clock signals, including non-time and propagation aspects thereof, and determination of times of day and times of week appropriate for a given establishment.

Now turning to FIG. 25, there is shown an embodiment architecture of the activator 610, deactivator 620 and reactivator 630 subsystems, each of which may share a common subsystem level architecture.

Components include:

Energy Transfer Module 670 is the interface to the remote-activation lock 600. Once the higher level security module approves the activation, deactivation, or reactivation process, the energy transfer module 680 transfers energy to the remote-activation lock 600 to complete the activation, deactivation, or reactivation process. The energy applied, depending on the configuration of the remote-activation lock 600 may be electromagnetic, optical, chemical, mechanical, ultrasonic, other individual means or combinations of the same.

Security Module 680 authorizes the activation, deactivation, or reactivation process that is requested by the user. The Security Module 680 may include accessing data stored internally in the device, or data stored in a local server 640, a remote server 650, or embedded in lock 600 itself in an RFID chip, barcode label, or other electronically or optically readable indicia. The Security Module 680 is self-protecting. Data stored locally is rendered inaccessible when the device is removed from power, or when removed from a valid communication connection with one of the servers for a predetermined period of time. Various ways of protecting the data are employed to impede removal of data from the device and to ensure that even in the event that the data can be extracted from the device it would be of no value to the attacker. For example, locally and remotely available data storage may include indices for article identifiers that will never occur in legitimate operation. Key subsystems, notable deactivators, may be programmed to shut down immediately or gracefully when they encounter such "kill codes," as these would only be presented to the system by illegitimate users such as hackers and thieves. Subsystems may also be directed to continue to operate only when they have received a data or software update or completed an authentication protocol within a certain period. Data and software updates may be keyed to the history of information expected on a given subsystem. For example, an update for a given deactivator may be keyed to the most recent N updates that the deactivator should have received, or to a checksum or other digest thereof, thus imposing on hackers the burden of monitoring the history of the device.

Security Module 680 may optionally provide security based on adaptive usage monitoring algorithms to be disclosed in other submissions. If unusual activation, deactivation, or reactivation activity is detected based on past usage, the subsystem device may require further authorization before completing the request. The device may be configured to detect its location, either geographically or virtually (i.e. through what communications path) to restrict use of the device to only allowable locations, further rendering the device useless if it is stolen. An authentication process may be required before allowing a user to use the device.

Logging Module 690 logs all activity as a way of affording information for back office analysis of activation, deactivation, or reactivation activity to detect "friendly attacks", that is, of employees using the device(s) in unauthorized ways. Activity logs may include but are not limited to the activity, the time/date, the user, the location, the product and/or lock batch ID, software modification data, power up/down data and any other data that may be deemed of value in identifying malicious behavior.

Communications Module 700 manages the communications for the subsystem device to the optional local server 640, remote server 650, and to a service device 660 that may replace remote communications for the purpose of activating the device, installing software updates, downloading logs, or updating databases if the subsystem device is not connected to any Local 640 or Remote Servers 650, to the lock 600 for identification of the products to be unlocked, or to a separate POS system that, in optional embodiments, may supply information about the validity of a product purchase.

Embodiment systems may be fully capable of operating standalone, networked with other subsystem devices, networked with a local server 640, networked with a remote server 650, or any combination of these communications options. The Systems may provide additional features (such as making a deactivation conditional on signal of a completed sale) through integrating its operation with that of an in-store point-of-sale (POS) system. POS integration is an optional feature of the system.

Additional Embodiments

As previously described, an RFID tag may be employed in the remote-activation lock system. An RFID typically provides information upon receipt of a RF interrogating signal which is of such strength to generate enough power in the RFID for internal data to be read and then broadcast back. The broadcast back can be done by an emitter which transmits a signal anywhere within the electromagnetic spectrum.

In an embodiment, the RFID tag includes a resonance structure that is operatively configured to provide information deriving from resonance related to receipt of a specified interrogating signal. Upon receipt of the appropriate interrogation signal, resonance from the structure may be determined by an external detector, or may entail receipt of an actual response signal by an external receiver if the resonance structure is operatively coupled to an emitter associated with the RFID. The bandwidth of the response is determined, in part, by the Q of the resonant structure. In one such resonance structure embodiment, the resonance structure comprises a magnetostrictive/electrostrictive (ME) coupled structure having multiple resonance frequencies. Multiple MEs may be employed each of which has a resonance frequency. Resonance frequency may be altered by altering physiochemical characteristics of the ME coupled structure, such as the shape, length, or configuration of the ME coupled structure. Collectively, information for identification is communicated through the resonant frequencies.

In another embodiment, the RFID chip is integrated with an antenna onto a single substrate so that traditional wafer-level fabrication techniques may be used to create the device. In one such embodiment, the ME coupled structure acts the antenna.

In another embodiment, power generation may be feature of the RFID device. Power generation may be, for example, effectuated through activation of the ME coupled structure by exposing such ME to the appropriate magnetic field to cause current to flow in the electrostrictive component of the ME. For example, the magnetostrictive component may physically deform to cause a stress to be applied to a piezoelectric element (comprising the electrostrictive component) thereby causing a current to flow.

In accordance with this embodiment, an RFID tag may comprise an integrated circuit and an antenna located on a substrate. The antenna may further comprise one or more magnetostrictive (M) layer(s) and electrostrictive (E) layer(s) forming an ME structure. The electrostrictive layer may be a piezoelectric layer (PE). The piezoelectric layer may be, without limitation, lead zirconium titanate (PST) or quartz and Rochelle salt. The magnetostrictive layer may be an alloy incorporating rare earth materials such as, without restriction, Terfenol-D, a specially formulated alloy of terbium, dysprosium and iron that exhibits large magnetostriction at room temperature and relatively small applied fields. The coupled magnetostrictive/electrostrictive structure may be fabricated directly onto the substrate. The ME structure may comprised a single magnetostrictive (MS) and electrostrictive layer or numerous layers of alternating materials, so long as the field response of each layer affects its neighbors. The integrated circuit (IC) may be fabricated separately and bonded onto the ME structure or alternately fabricated using traditional wafer-level fabrication techniques.

The ME structure may be fabricated into fingers of various lengths. The fingers of various lengths may formed by lithography, deposition, or etching. Tuning of the finger lengths may be performed by laser trimming or other cutting process. Alternatively, fingers of various lengths may be fabricated directly by selective material growth. Within the ME structure, the MS material holds a certain shape in its relaxed state. When a magnetic field is applied to the MS material, the material responds by changing some or all of its dimensions from those of the relaxed state. Application of an oscillating magnetic field results in oscillating deformations. The adjacent or interleaved PE material also holds a certain shape in its relaxed state. When subjected to physical stress, the material will exhibit strain. The strain causes the PE crystal to deform and produce a voltage differential. In the ME structure, the oscillating deformations of MS layer(s) reacting to an applied magnetic field will in turn deform the Electrostrictive material, which may comprise a PE layer, situated adjacent to or between the MS layer. Consequently, the PE layers will produce the voltage differential. Thus, the application of a oscillatory magnetic field imparts an alternating voltage, which can be rectified using a diode. The oscillatory magnetic field will maximally couple into a finger when the field oscillates at the finger's resonant frequency. Unique identification of the RFID tag, by it's frequency response, may be implemented by incorporating fingers of different lengths. Sweeping through a range of frequencies will excite each finger at its specific resonant frequency, and provide a unique signature for the device.

A transmitter may be employed to broadcast this information using any desired electromagnetic frequency, for instance, AM or FM signals at 10 to 10,000 kilohertz, optical energy using any optical frequency, including ultraviolet, visible, infrared or terahertz frequencies. When optical frequencies are used, an OLED (organic light emitting diode) may be used to transmit information from the device.

In an embodiment, an antenna may be integrated with the RFID device. A non-resonant magnetic field may be applied to the RFID tag to generate power. An on-board processor reads the identification from the identification chip registers. An active transmitter broadcasts this information using any desired electromagnetic frequency, for instance, AM or FM signals in the 10 to 10,000 kilohertz or gigahertz range, optical energy using any optical frequency, including ultraviolet, visible, infrared or terahertz frequencies. When optical frequencies are used, an OLED (organic light emitting diode) may be used to transmit information from the device. The receiver for this device must be located with the required proximity to receive signals. The signals could also be measured by acoustic detectors as well.

In yet another embodiment, the RFID provides power generating capability with or without the integrated antenna. In this embodiment, the first step is to generate the most efficient power. Once the part has been identified and it is necessary to provide power to it (for example, to release a tag), an on-board switch may be activated. This switch could be, but is not limited to, a MEMs (microelectromechanical) relay or a transistor. Power is then delivered to the active load. The power could be generated directly from the ME structure, or from stored energy (ME and capacitor) or a battery. In one embodiment, sufficient power to power the RFID integrated circuit is not generated unless at least a plurality of resonators comprising the coupled magnetostrictive/electrostrictive layers are excited.

In another embodiment, the powered integrated circuit causes a switch to be altered such that an operation of the item to which the RFID tag is applied is activated. In one such embodiment, a tag is released so as to remove a short circuit that prevents use of the item to which it is attached.

In an embodiments there is disclosed a remote-activation lock assembly that comprises a sleeve structure defining a containment cavity sized to receive a product to be protected. The sleeve structure, containing the product to be protected, is bonded into a receptacle so that access to the product through access into the containment cavity is prevented by the receptacle's structure. The sleeve structure and the receptacle are manufactured from materials that are sufficiently durable to prevent unauthorized access to the containment cavity without damaging the protected product.

In one embodiment, there is provided a sleeve-receptacle benefit denial locking package that locks a memory card, such as Secure Digital, into a secure package. In such an embodiment, the sleeve containing the memory card is bonded to the receptacle by means of adhesive compositions and/or structures. If stolen, the benefits of the memory card would be denied since attempts to extract the card from the locking package would result in damage to the memory card.

FIG. 26A illustrates an embodiment of a remote-activation lock assembly designed to protect a memory card from theft. The apparatus comprises a hollow receptacle 1200 whose inner surface 1210 defines a cavity. The cavity is opened at the surface of the hollow receptacle 1200. The dimensions of the inner surface 1210 are sized to permit the sliding insertion of sleeve 1220. Sleeve 1220, in turn, is dimensioned to permit the insertion of memory card 1230, or any other item to be protected into a containment cavity. Memory card 1230, or any other product, is inserted into the containment cavity of sleeve 1220 at its terminal opening 1225. An adhesive composition and/or structure 1240 is applied to or deposited on the inner base of receptacle 1200. Sleeve 1220 is inserted into the cavity of receptacle 1200 so that the lower surface of sleeve 1220 is parallel to the inner base of receptacle 1200. The adhesive composition and/or structure 1240 may be cured, as required, creating a strong and long-lasting bond between sleeve 1220 and receptacle 1200. A flange 1260 that allows the benefit denial apparatus to be fastened to the packaging material may be integrated into the lower outer surface of receptacle 1200. In an embodiment, the flange is captured by cardboard in the packaging whereby a continuous sheet of cardboard or paper 1270 is placed under the flat surface of the package and a sheet of cardboard or paper with a square aperture 1280 allowing receptacle 1200 to protrude through is affixed to the top surface of flange 1260.

Since the bond between sleeve 1220 and the receptacle 1200 is very strong, attempts to thwart the benefit denial locking package and remove the sleeve using excessive physical force would damage the memory card 1230 or other asset, resulting in a denial of benefits.

Receptacle 1200 may be made of polycarbonate, ABS, plastic or other suitably strong material. Sleeve 1220 may be made of any similarly stiff, strong, low cost material. The locking package may be designed so that sleeve 1220 is flush with the upper surface 1250 of receptacle 1200 or recessed. In the advantageous embodiment of the invention illustrated in FIG. 26B, the locking package is designed so that after deactivation, the expansion of adhesive composition and/or structure 1240 does not raise sleeve 1220 high enough in a vertical direction to allow memory card 1230 or other protected assets to slide out of the terminal 1225 opening of sleeve 1220, eliminating the potential of protected items falling out of the package after deactivation. In such case an additional mechanical force may be externally applied to further remove the sleeve 1220, thereby allowing the protected item to be removed.

As previously disclosed, when access to the product is authorized, the bond between the sleeve structure and the receptacle may be released by application of a specific profile of externally applied energy. Referring to FIG. 26B, there is shown the embodiment of FIG. 26A wherein an external stimulus with an appropriate energy profile has been applied to the benefit denial locking package. (i.e. the locking mechanism is deactivated.) The energy from the external stimulus is received by adhesive composition and/or structure 1240, causing adhesive composition and/or structure 1240 to expand. As adhesive composition and/or structure 1240 expands, the bond between sleeve 1220 and the inner base surface of receptacle 1200 is broken, allowing sleeve 1220 with the inserted memory card 1230 or other asset to be removed from the cavity of receptacle 1200. The memory card 1230 or other asset may then be removed from sleeve 1220.

In alternative embodiments, the release of the bond between the sleeve structure and the receptacle may be accomplished, without limitation, by a change in the adhesive properties of the bonding material alone or in combination with mechanical force applying mechanisms (i.e. springs, levers, etc.). In additional embodiments, the bond may be implemented by mechanical latch mechanisms wherein deactivation of the bond is accomplished by application of a specified profile of externally applied energy to materials, incorporated in the mechanical latch, that, in response, change mechanical state or characteristics.

Embodiment of a Transaction Sequence for a Protected Product

An embodiment of a remote-activation lock product purchase and deactivation system comprises a computer or controller that coordinates the various activities of the purchase and deactivation processes; a bar code reader that reads the retailer's bar code on the product to determine product price and other information such as SKU; a bill processing apparatus to receive cash payment for the product and dispense change; a credit card reader, an RFID reader to read remote-activation lock product identification information from the on-product device; a remote-activation lock Authentication system, a secure server running a database which stores records, among which are those that match the remote-activation lock product IDs to their respective keys, the keys comprising electromagnetic signals with various energy profiles; a deactivator that sends the appropriate electromagnetic signal to unlock the benefit denial lock; a display; and communication hardware that allows the computer or controller to receive information and send commands to various devices including the remote-activation lock authentication server, and several of the devices to communicate to external systems or with each other (for example, the credit card reader to an external verification system). In an embodiment, the RFID tag and reader is replaced by a second bar code affixed to the product and read by the bar code reader already utilized to read the retailer's bar code. The remote-activation lock product purchase and lock deactivation system would typically be housed in a kiosk, but need not be. A practical non-kiosk embodiment applies a lock or assembly of locks using electrically releasable adhesives to engage protective structures that block access to products battery ports, signal ports, displays, and/or buttons and switches essential to effective or convenient operation of the products. Removal of the locks may be effected by connecting the product to a signal. In practice, the signal connection may via a USB or similar port on a computer or similar device, and the proper signal to effectively unlock a product from its protective structure(s) may become available only after a product registration or access control procedure has been completed. Such procedures may be completed in a store, at or near the point of sale, or in the customer's home or office, at or near the point of use. This embodiment may be useful for protecting printer cartridges, digital cameras, personal digital assistants (PDAs), communications devices, media players, certain register-able weapons such as Tasers, certain medical devices, and certain computers, especially handheld, notebook, and tablet computers that tend to be regularly docked to other computers or connected to data networks as they rely on information and firmware updates. By blocking battery chambers, signal ports, electrodes, displays, and switches, both the usability and the salability of items prone to supply-chain and retail theft may be conspicuously impaired. This benefits of this approach may be superior to software-only access control schemes in which locked and unlocked products look the same or nearly the same and which may be vulnerable to the well-known hackability of security systems that are based on software alone.

When the consumer is ready to purchase a product with a remote-activation lock attached to it, they approach the kiosk or system. The consumer scans the product with the bar code reader and the product's price is shown on the display. The controller or computer instructs the consumer to insert payment. If the payment is in cash, bills are inserted into the bill processing apparatus, which verifies their authenticity, and then dispenses change, if required. If the payment is by credit card, the controller instructs the consumer to insert their card, which is verified, and charged. The controller notifies the retailer's inventory system of the purchase. When payment has been made, the controller confirms the product purchase on the display, prints a receipt, and instructs the customer to scan the product with the RFID reader. The RFID reader may be embedded in a counter or may be a handheld unit. The RFID on the product sends a signal with the product identification number to the RFID reader. The RFID reader sends the product ID to the remote-activation lock authentication system to determine the key, which is the corresponding electromagnetic signal profile required for remote-activation lock deactivation. The remote-activation lock authentication system sends required the electromagnetic signal profile to the controller, which subsequently sends it to the deactivation unit. The deactivator is used to send the appropriate electromagnetic signal to the on-product remote-activation lock which is located on the product, and the on-product device is unlocked. The on-product device may comprise one or more of the following: a magnetic lock, an adhesive lock, a locked spider wrap, a locked DVD hub, a locked USB device, locked bottles, locked cigarettes or any other product that has been secured by remote-activation lock technology.

Example of Two-Part Epoxy Thermal Release Adhesives:
Part A:
Epon Resin 863 (flexion) 30 g
031 DUX 40 (Expancel) 20 g
The materials was mixed well to give a white paste.
Part B:
Ancamine 2390 (Air Product) 40 g
Part A and Part B are mixed well. The mixed adhesive has a ~19 minutes working lift at 25° C. After the adhesive is applied, it is recommended to cure at 25° C. for 24 hours or more to reach ultimate adhesive strength.
Specifics on Electro Release Adhesives:
Two-Parts Polyurethane Adhesives:
Preferred polar polymers are polyethylene glycol from Dow Chemicals, Carbowax PEG 200, 300, 400, 540, 600, 1000, and 1450. Preferred non-polar polymers are hydroxyl terminated silicone polymers such as GP 690 and OP 676 from Genesee Polymer Technology. Preferred non-polar polymers can also be fluoro-polymers such as Fluorolink D10, D10-H, E-10, E10-H, ETX from Solvey Solexis.
Example:
Part A:
Carbowax PEG 600 (Dow) 50 g
Ammonium hexafluorophosphate 20 g
Mix well to make sure the salt dissolves in the polar polymer.
Part B:
GP690 (Genesee Polymer Technology) 50 g
MDI (BASF) 20 g
The mixer was heated to 70° C. to obtain a viscous liquid.
Part A and Part B are mixed well. After the adhesive is applied, it is recommended to cure at 70° C. for 2 hours or more to reach ultimate adhesive strength.

STATEMENT REGARDING PREFERRED EMBODIMENTS

While the invention has been described with respect to preferred embodiments, those skilled in the art will readily appreciate that various changes and/or modifications can be made to the invention without departing from the spirit or scope of the invention as defined by the appended claims. All documents cited herein are incorporated by reference herein where appropriate for teachings of additional or alternative details, features and/or technical background.

What is claimed is:

1. An energy-releasable structure comprising:
an adhesive mixture comprising, an adhesive base;
at least one polar polymer substantially uniformly dispersed throughout said adhesive base;
at least one non-polar polymer substantially uniformly dispersed throughout said adhesive base and wherein said non-polar polymer is selected from the one or more of the group consisting of: silicone polyols, fluorinated polyols, polybutadiene polyols, carboxy terminated polybutadienes, isocyanate-terminated polybutadienes, and melainized polybutadienes; and
at least one energy converter comprising electrically conductive material substantially uniformly dispersed throughout said adhesive base;

wherein said adhesive mixture can transition from a first physiochemical state to a second physiochemical state upon application of a transmitted specific profile of energy, said transmitted energy is one or more selected from the group consisting of: magnetic, electrical, electromagnetic, acoustic, light, and heat.

2. The energy-releasable structure of claim 1, wherein the electrically conductive material is selected from the one or more of the group consisting of: conductive salts, metal particles, metal wires, nanowires, and carbon nanotubes.

3. The energy-releasable structure of claim 1, wherein said first physiochemical state is a first adhesion state and the second physiochemical state is a distinctly different second adhesion state.

4. The energy-releasable structure of claim 1, wherein said first physiochemical state is a first density state and the second physiochemical state is a distinctly different second density state.

5. The energy-releasable structure of claim 1, wherein the polar polymer is selected from one or more of the group consisting of: polyether polyols, polyester polyols, polycarbonate polyols, and amine terminated polyols.

6. A laminate comprising:
   a magnetostrictive layer having a top longitudinal surface and a bottom longitudinal surface;
   as electrostrictive layer having a top longitudinal surface and a bottom longitudinal surface, said top longitudinal surface of said electrostrictive layer being coupled to said bottom longitudinal surface of said magnetostrictive layer;
   an adhesive mixture layer having a top longitudinal surface and a bottom longitudinal surface, said adhesive mixture layer top longitudinal surface coupled to said bottom longitudinal surface of said electrostrictive layer; said adhesive mixture layer comprising:
      an adhesive base;
      at least one polar polymer substantially uniformly dispersed throughout said adhesive base;
      at least one non-polar polymer substantially uniformly dispersed throughout said adhesive base and wherein said non-polar polymer is selected from the one or more of the group consisting of: silicone polyols, fluorinated polyols, polybutadiene polyols, carboxy terminated polybutadienes, isocyanate-terminated polybutadienes, and melainized polybutadienes; and
      at least one energy converter comprising electrically conductive material substantially uniformly dispersed throughout said adhesive base;
         wherein said adhesive mixture can transition from a first physiochemical state to a second physiochemical state upon application of a transmitted specific profile of energy, said transmitted energy is one or more selected from the group consisting of: magnetic, electrical, electromagnetic, acoustic, light, and heat.

7. The laminate in accordance with claim 6, wherein the electrically conductive material of said adhesive mixture is selected from the one or more of the group consisting of: conductive salts, metal particles, metal wires, nanowires, and carbon nanotubes.

8. The laminate in accordance with claim 6, said first physiochemical state is a first density state and the second physiochemical state is a distinctly different second density state.

9. The laminate in accordance with claim 6, wherein the first physicochemical state is a first adhesion state and the second physicochemical state is a second adhesion state.

10. The laminate in accordance with claim 6, wherein the polar polymers of said adhesive mixture is selected from the one or more of the group consisting of: polyether polyols, polyester polyols, polycarbonate polyols, and amine terminated polyols.

\* \* \* \* \*